(12) United States Patent
Lee et al.

(10) Patent No.: US 8,289,310 B2
(45) Date of Patent: Oct. 16, 2012

(54) HORIZONTAL ELECTRIC FIELD LIQUID CRYSTAL DISPLAY

(75) Inventors: Suwoong Lee, Paju-si (KR); Youngmin Jeong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 649 days.

(21) Appl. No.: 12/458,643

(22) Filed: Jul. 17, 2009

(65) Prior Publication Data

US 2010/0103085 A1    Apr. 29, 2010

(30) Foreign Application Priority Data

Oct. 28, 2008  (KR) .................. 10-2008-0106149

(51) Int. Cl.
 *G06F 3/038*  (2006.01)
 *G09G 5/00*   (2006.01)
 *G09G 3/36*   (2006.01)
(52) U.S. Cl. ............... 345/212; 345/92; 345/100
(58) Field of Classification Search .............. 345/212
 See application file for complete search history.

(56) References Cited

U.S. PATENT DOCUMENTS

2006/0232537 A1*  10/2006  Kim et al. ............. 345/92
2008/0001901 A1*  1/2008  Lee ....................... 345/100

* cited by examiner

*Primary Examiner* — Alexander S Beck
*Assistant Examiner* — Charles V Hicks
(74) *Attorney, Agent, or Firm* — McKenna, Long, and Aldridge, LLP.

(57) ABSTRACT

A horizontal electric field liquid crystal display (LCD) is disclosed. The horizontal electric field LCD includes a first liquid crystal cell driven by a voltage difference between a first pixel electrode and a second pixel electrode, a second liquid crystal cell driven by a voltage difference between a third pixel electrode and a fourth pixel electrode, a first data line to which a first analog data voltage is supplied, a second data line to which a second analog data voltage and a fourth analog data voltage are supplied, a third data line to which a third analog data voltage is supplied, a first gate line that receives a first scan pulse to select the first liquid crystal cell, a second gate line that receives a second scan pulse to select the second liquid crystal cell, first, second, third, and fourth thin film transistors. The second pixel electrode is spaced apart from the second gate line, and the fourth pixel electrode is spaced apart from the first gate line.

17 Claims, 25 Drawing Sheets

(a)　　　　　　　　　　　　(b)

nth Frame Period (n+1)th Frame Period nth Frame Period (n+1)th Frame Period nth Frame Period (n+1)th Frame Period

HORIZONTAL ELECTRIC FIELD LIQUID CRYSTAL DISPLAY

This application claims the benefit of Korea Patent Application No. 10-2008-0106149 filed on Oct. 28, 2008, the entire contents of which is incorporated herein by reference for all purposes as if fully set forth herein.

BACKGROUND OF THE INVENTION

1. Field of the Invention

Embodiments of the invention relate to a liquid crystal display, and more particularly, to a horizontal electric field liquid crystal display capable of preventing a reduction in the image quality caused by an inversion scheme.

2. Discussion of the Related Art

Liquid crystal displays (LCDs) generally display an image by adjusting a light transmittance of liquid crystals using an electric field. The liquid crystal displays are classified into a vertical electric field LCD and a horizontal electric field LCD depending on a direction of the electric field driving the liquid crystals. In the vertical electric field LCD, because a common electrode on an upper substrate and a pixel electrode on a lower substrate oppose each other, liquid crystals of a twisted nematic (TN) mode are driven due to a vertical electric field between the common electrode and the pixel electrode. The vertical electric field LCD has an advantage of a large aperture ratio but a defect of a small viewing angle. In the horizontal electric field LCD, liquid crystals of an in-plane switching (IPS) mode are driven due to a horizontal electric field between a pixel electrode and a common electrode that are positioned parallel to each other on a lower substrate. The horizontal electric field LCD has an advantage of a wide viewing angle.

The horizontal electric field LCD includes a liquid crystal display panel, on which the liquid crystals are arranged in a matrix format, and a driving circuit for driving the liquid crystal display panel. The driving circuit includes a data drive circuit generating a data voltage and a gate drive circuit generating a scan pulse.

The liquid crystal display panel, as shown in FIG. 1, includes a gate line GL and a data line DL crossing each other and a thin film transistor (TFT) that is positioned at a crossing of the gate line GL and the data line DL to drive a liquid crystal cell Clc. The TFT supplies a data voltage Vdata supplied through the data line DL to a pixel electrode Ep of the liquid crystal cell Clc in response to a scan pulse supplied through the gate line GL. For this, a gate electrode of the TFT is connected to the gate line GL, a source electrode of the TFT is connected to the data line DL, and a drain electrode of the TFT is connected to the pixel electrode Ep of the liquid crystal cell Clc. The liquid crystal cell Clc is charged to a voltage difference between the data voltage Vdata supplied to the pixel electrode Ep and a common voltage Vcom supplied to a common electrode Ec. An arrangement state of liquid crystal molecules changes due to an electric field produced by the voltage difference, and thus an amount of transmitted light is adjusted or the transmitted light is intercepted. The common electrode Ec is formed on the upper substrate or the lower substrate of the liquid crystal display panel depending on an applying manner of an electric field to the liquid crystal cell Clc. A storage capacitor Cst is formed between the common electrode Ec and the pixel electrode Ep of the liquid crystal cell Clc to keep a charging voltage of the liquid crystal cells Clc.

The horizontal electric field LCD, as shown in FIG. 2, is driven in an inversion scheme, in which a polarity of the data voltage Vdata is inverted every predetermined period based on the common voltage Vcom, so as to prevent deterioration and image sticking of the liquid crystal cell Clc. During an n-th frame period Fn, the liquid crystal cell Clc is charged to a positive data voltage Vdata(+) output by the data drive circuit and then is kept at a positive pixel voltage Vp(+) due to a parasitic capacitor Cgs (refer to FIG. 1), etc. of the TFT. A magnitude of the positive pixel voltage Vp(+) is a value obtained by subtracting an absolute value of a feed through voltage ΔVp from the positive data voltage Vdata(+). During an (n+1)-th frame period F(n+1), the liquid crystal cell Clc is charged to a negative data voltage Vdata(−) output by the data drive circuit and then is kept at a negative pixel voltage Vp(−) due to the parasitic capacitor Cgs, etc. of the TFT. A magnitude of the negative pixel voltage Vp(−) is a value obtained by adding an absolute value of a feed through voltage ΔVp to the negative data voltage Vdata(−). The feed through voltage ΔVp is defined by the following Equation 1.

$$\Delta Vp = \frac{Cgs'}{Cgs' + Clc' + Cst'} \Delta Vg \qquad \text{[Equation 1]}$$

In the above Equation 1, Cgs' indicates a parasitic capacitance of the parasitic capacitor Cgs between the gate electrode and the source electrode (or the drain electrode) of the TFT, Clc' indicates an equivalent capacitance of the liquid crystal cell Clc, Cst' indicates a capacitance of the storage capacitor Cst, and ΔVg indicates a difference voltage between a gate high voltage and a gate low voltage.

As indicated in Equation 1, even if positive and negative data voltages of the same scale level are respectively supplied to the liquid crystal cells Clc during two frame periods through the inversion scheme, a charge amount of the liquid crystal cells Clc during the frame period where the positive data voltage is supplied is less than a charge amount of the liquid crystal cells Clc during the frame period where the negative data voltage is supplied because of a difference between charging voltages of the parasitic capacitor Cgs during the frame periods. For example, while the parasitic capacitor Cgs is charged to a difference voltage 10V between a gate high voltage 25V and a positive white voltage 15V during the n-th frame, the parasitic capacitor Cgs is charged to a difference voltage 24V between the gate high voltage 25V and a negative white voltage 1V during the (n+1)-th frame. Therefore, a charge amount of the liquid crystal cells Clc during the frame period where the positive data voltage is supplied is less than a charge amount of the liquid crystal cells Clc during the frame period where the negative data voltage is supplied because of the feed through voltage ΔVp affected by a difference between the charging voltages of the parasitic capacitor Cgs during the frame periods. If the charge amount of the liquid crystal cell Clc varies every frame period, the deterioration in the image quality such as a flicker and image sticking occurs because of non-uniformity of data. The storage capacitor Cst is necessary and the capacitance Cst' of the storage capacitor Cst has to be large so as to reduce the non-uniformity of the charge amounts of the liquid crystal cell during frame periods. However, in the related art horizontal electric field LCD, an aperture ratio is reduced because of the storage capacitor Cst.

Further, a method for controlling a level of the common voltage Vcom depending on a magnitude of a voltage offset resulting from the feed through voltage ΔVp has been proposed so as to solve the non-uniformity of the charge amounts of the liquid crystal cell Clc during frame periods. However, in the liquid crystal display, because the magnitude of the voltage offset resulting from the feed through voltage ΔVp varies every location, it is impossible to control an optimum common voltage at each location through only a change in the level of the common voltage Vcom being a constant voltage. Accordingly, it is limited to prevent the deterioration in the image quality caused by the non-uniformity of the charge amounts of the liquid crystal cell during the frame periods.

SUMMARY OF THE INVENTION

Embodiments of the invention provide a horizontal electric field liquid crystal display capable of preventing a deterioration of the image quality and increasing an aperture ratio by solving non-uniformity of charge amounts of a liquid crystal cell during frame periods caused by an inversion scheme.

In one aspect, there is a horizontal electric field liquid crystal display (LCD) comprising a first liquid crystal cell that is driven by a voltage difference between a first pixel electrode and a second pixel electrode, a second liquid crystal cell that is driven by a voltage difference between a third pixel electrode and a fourth pixel electrode, a first data line to which a first analog data voltage to be applied to the first pixel electrode is supplied, a second data line to which a second analog data voltage to be applied to the second pixel electrode and a fourth analog data voltage to be applied to the fourth pixel electrode are supplied, a third data line to which a third analog data voltage to be applied to the third pixel electrode is supplied, a first gate line that crosses the first to third data lines and receives a first scan pulse to select the first liquid crystal cell, a second gate line that crosses the first to third data lines and receives a second scan pulse to select the second liquid crystal cell, a first thin film transistor that supplies the first analog data voltage to the first pixel electrode in response to the first scan pulse, a second thin film transistor that supplies the second analog data voltage to the second pixel electrode in response to the first scan pulse, a third thin film transistor that supplies the third analog data voltage to the third pixel electrode in response to the second scan pulse, and a fourth thin film transistor that supplies the fourth analog data voltage to the fourth pixel electrode in response to the second scan pulse, wherein the second pixel electrode is spaced apart from the second gate line, and the fourth pixel electrode is spaced apart from the first gate line.

Each of the first and second scan pulses has a width of ½ horizontal period. A supply of the first scan pulse follows a supply of the second scan pulse.

Each of the first and third pixel electrodes includes a plurality of first finger units parallel to the first to third data lines and a first connection unit that is formed parallel to the first and second gate lines to commonly connect the first finger units to one another. Each of the second and fourth pixel electrodes includes a plurality of second finger units, that are formed parallel to the first to third data lines to respectively oppose the first finger units, and a second connection unit that is formed parallel to the first and second gate lines to commonly connect the second finger units to one another.

The first liquid crystal cell further includes a first gate shield pattern, that projects from the second gate line and is formed parallel to the first data line to be spaced apart from the first data line at a predetermined distance, and a second gate shield pattern that projects from the second gate line and is formed parallel to the second data line to be spaced apart from the second data line at a predetermined distance. The second liquid crystal cell further includes a third gate shield pattern, that projects from the first gate line and is formed parallel to the second data line to be spaced apart from the second data line at a predetermined distance, and a fourth gate shield pattern that projects from the first gate line and is formed parallel to the third data line to be spaced apart from the third data line at a predetermined distance.

Outermost finger units at both sides of the second pixel electrode are respectively spaced apart from the first and second gate shield patterns. Outermost finger units at both sides of the fourth pixel electrode are respectively spaced apart from the third and fourth gate shield patterns.

A number of first finger units is equal to a number of second finger units or is fewer one than the number of second finger units.

Each of the first and third pixel electrodes includes a plurality of first finger units inclining to the first and second gate lines and a first connection unit that is formed parallel to the first to third data lines to commonly connect the first finger units to one another. Each of the second and fourth pixel electrodes includes a plurality of second finger units, that incline to the first and second gate lines to respectively oppose the first finger units, and a second connection unit that is formed parallel to the first to third data lines to commonly connect the second finger units to one another.

The first liquid crystal cell further includes a first gate shield pattern, that projects from the second gate line and is formed parallel to the first data line to be spaced apart from the first data line at a predetermined distance, and a second gate shield pattern that projects from the second gate line and is formed parallel to the second data line to be spaced apart from the second data line at a predetermined distance. The second liquid crystal cell further includes a third gate shield pattern, that projects from the first gate line and is formed parallel to the second data line to be spaced apart from the second data line at a predetermined distance, and a fourth gate shield pattern that projects from the first gate line and is formed parallel to the third data line to be spaced apart from the third data line at a predetermined distance.

The connection units of the first to fourth pixel electrodes are spaced apart from the first to fourth gate shield patterns, respectively.

In one aspect, there is a horizontal electric field liquid crystal display (LCD) comprising a first liquid crystal cell that is driven by a voltage difference between a first pixel electrode and a second pixel electrode, a second liquid crystal cell that is driven by a voltage difference between a third pixel electrode and a fourth pixel electrode, a first data line to which a first analog data voltage to be applied to the first pixel electrode is supplied, a second data line to which a second analog data voltage to be applied to the second and fourth pixel electrodes is supplied, a third data line to which a third analog data voltage to be applied to the third pixel electrode is supplied, a gate line that crosses the first to third data lines and receives a scan pulse to select the first and second liquid crystal cells, a first thin film transistor that supplies the first analog data voltage to the first pixel electrode in response to the scan pulse, a second thin film transistor that supplies the second analog data voltage to the second pixel electrode in response to the scan pulse, a third thin film transistor that supplies the third analog data voltage to the third pixel electrode in response to the scan pulse, and a fourth thin film transistor that supplies the second analog data voltage to the fourth pixel electrode in response to the scan pulse, wherein each of the second and fourth pixel electrodes is spaced apart from a previous gate line to which the scan pulse is supplied earlier than the gate line.

In one aspect, there is a horizontal electric field liquid crystal display (LCD) comprising a first liquid crystal cell that is driven by a voltage difference between a first pixel electrode and a second pixel electrode, a second liquid crystal cell that is driven by a voltage difference between a third pixel electrode and a fourth pixel electrode, a first data line to which a first analog data voltage to be applied to the first pixel electrode is supplied, a second data line to which a second analog data voltage to be applied to the second pixel electrode is supplied, a third data line to which a third analog data voltage to be applied to the third pixel electrode is supplied, a fourth data line to which a fourth analog data voltage to be applied to the fourth pixel electrode is supplied, a gate line that crosses the first to fourth data lines and receives a scan pulse to select the first and second liquid crystal cells, a first thin film transistor that supplies the first analog data voltage to the first pixel electrode in response to the scan pulse, a second thin film transistor that supplies the second analog data voltage to the second pixel electrode in response to the scan pulse, a third thin film transistor that supplies the third analog data voltage to the third pixel electrode in response to the scan pulse, and a fourth thin film transistor that supplies the fourth analog data voltage to the fourth pixel electrode in response to the scan pulse, wherein each of the second and fourth pixel electrodes is spaced apart from a previous gate line to which the scan pulse is supplied earlier than the gate line.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail embodiments of the invention examples of which are illustrated in the accompanying drawings.

First Exemplary Embodiment

FIGS. 3 to 12B illustrate a horizontal electric field liquid crystal display (LCD) according to a first exemplary embodiment of the invention.

Figure 1:
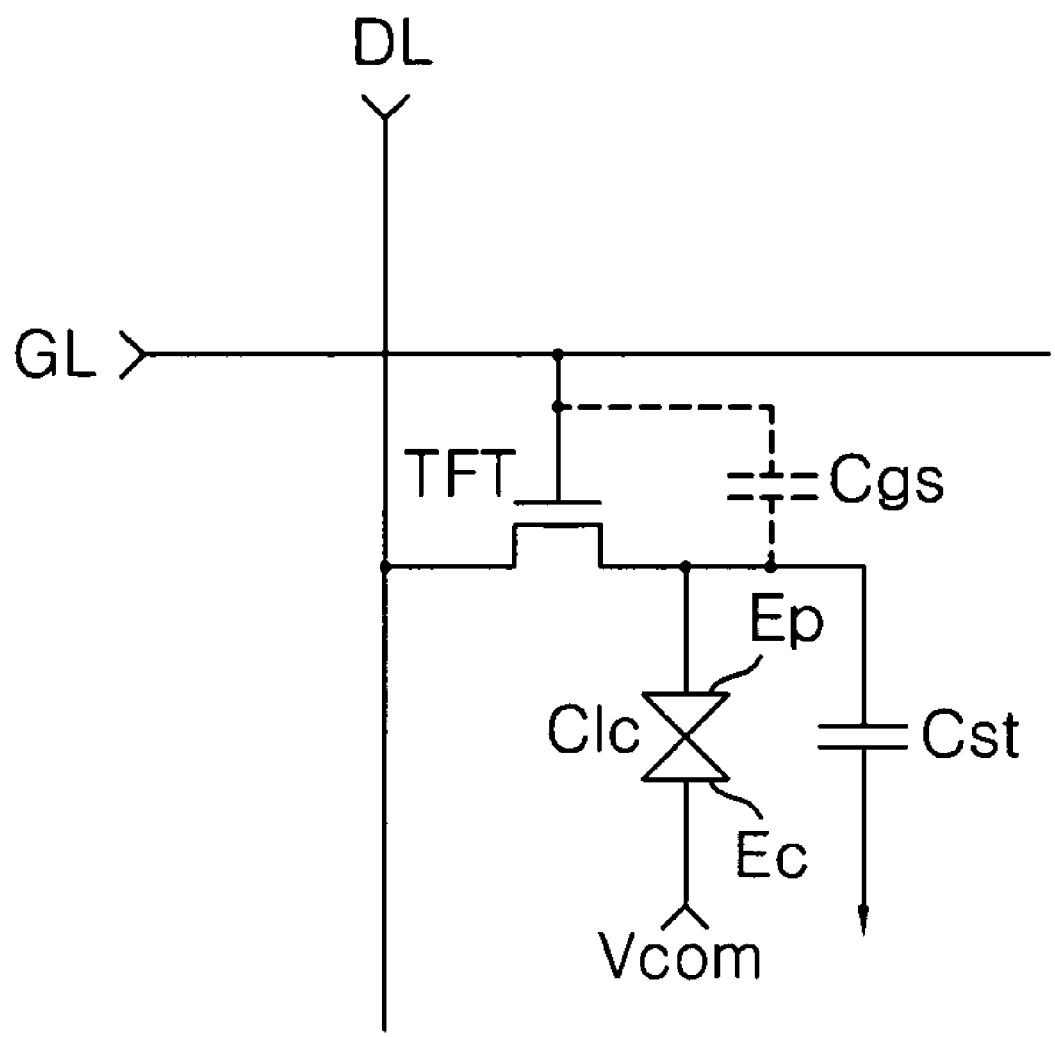
FIG. 1 is an equivalent circuit diagram of a related art liquid crystal display.
Figure 2:
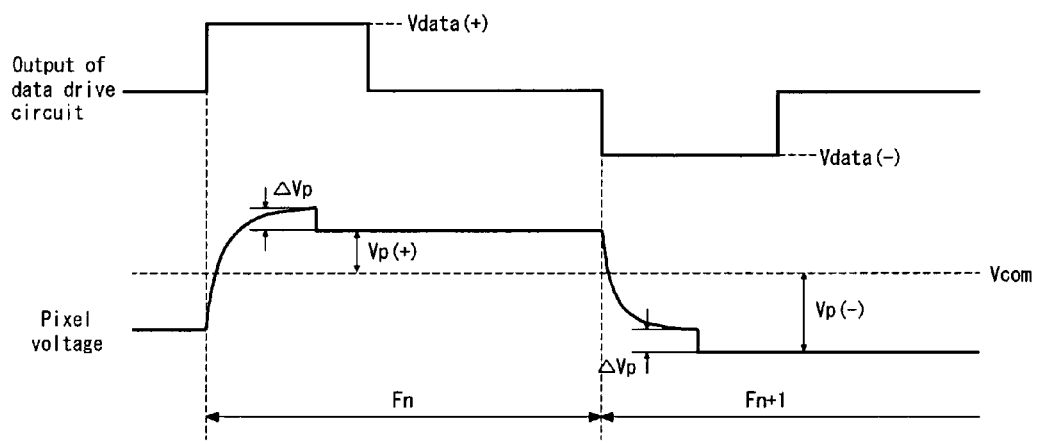
FIG. 2 is a waveform diagram for explaining a generation cause of a flicker and image sticking in the related art.
Figure 3:
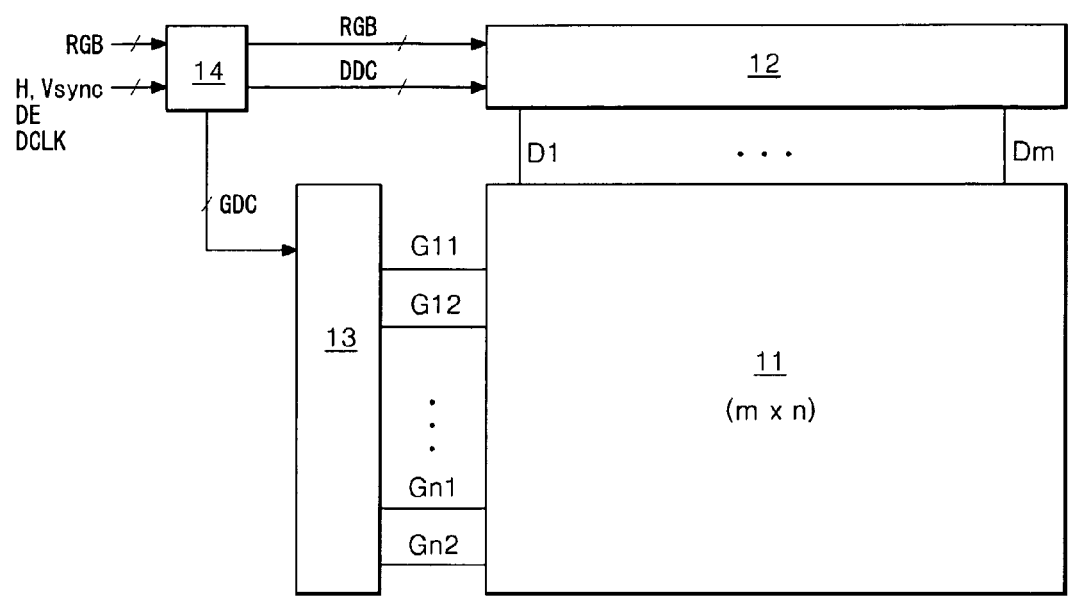
FIG. 3 is a block diagram showing a horizontal electric field liquid crystal display (LCD) according to a first exemplary embodiment of the invention.

As shown in FIG. 3, the horizontal electric field LCD according to the first exemplary embodiment of the invention includes a liquid crystal display panel 11, a data drive circuit 12, a gate drive circuit 13, and a timing controller 14.

The timing controller 14 receives timing signals, such as horizontal and vertical sync signals Hsync and Vsync, a data enable signal DE, a dot clock signal DCLK from a system board (not shown) to generate a data timing control signal DDC for controlling operation timing of the data drive circuit 12 and a gate timing control signal GDC for controlling operation timing of the gate drive circuit 13. The data timing control signal DDC includes a source sampling clock signal SSC indicating a latch operation of digital data inside the data drive circuit 12 based on a rising or falling edge, a source output enable signal SOE indicating an output of the data drive circuit 12, a polarity control signal POL indicating a polarity of a data voltage to be supplied to liquid crystal cells of the liquid crystal display panel 11, and the like. The gate timing control signal GDC includes a gate start pulse GSP, a gate shift clock signal GSC, a gate output enable signal GOE, and the like. The gate start pulse GSP indicates a start horizontal line of a scan operation during 1 vertical period in which one screen is displayed. The gate shift clock signal GSC is a timing control signal that is input to a shift resistor installed in the gate drive circuit 13 to sequentially shift the gate start pulse GSP, and has a pulse width corresponding to on-period of a thin film transistor (TFT). The gate output enable signal GOE indicates an output of the gate drive circuit 13. Further, the timing controller 14 rearranges digital video data RGB received from the system board in conformity with a resolution of the liquid crystal display panel 11 to supply the rearranged digital video data RGB to the data drive circuit 12.

The gate drive circuit 13 generates scan pulses selecting horizontal lines of the liquid crystal display panel 11 to receive an analog data voltage in response to the gate timing control signal GDC received from the timing controller 14 to supply the scan pulses to a plurality of pairs of gate lines (G11, G12) to (Gn1, Gn2). Scan pulses having a width corresponding to approximately ½ of 1 horizontal period are sequentially supplied to two gate lines constituting each gate line pair.

The data drive circuit 12 converts the digital video data RGB into an analog data voltage based on gamma reference voltages GMA generated by a gamma reference voltage generating unit (not shown) in response to the data timing control signal DDC received from the timing controller 14 to supply the analog data voltage synchronized with the scan pulse to data lines D1 to Dm of the liquid crystal display panel 11.

The liquid crystal display panel 11 includes an upper glass substrate, a lower glass substrate, and a liquid crystal layer between the upper and lower glass substrates. The liquid crystal display panel 11 includes m×n liquid crystal cells Clc arranged in a matrix format at each crossing of the m data lines D1 to Dm and the n gate line pairs (G11, G12) to (Gn1, Gn2). Namely, one data line and a pair of gate lines are assigned to each liquid crystal cell Clc.

A black matrix and a color filter are formed on the upper glass substrate of the liquid crystal display panel 11. The data lines D1 to Dm, the gate line pairs (G11, G12) to (Gn1, Gn2), thin film transistors (TFTs), and a storage capacitor are formed on the lower glass substrate of the liquid crystal display panel 11. Polarizing plates are attached respectively to the upper and lower glass substrates. Alignment layers for setting a pre-tilt angle of the liquid crystals are respectively formed on the upper and lower glass substrates.

Figure 4:
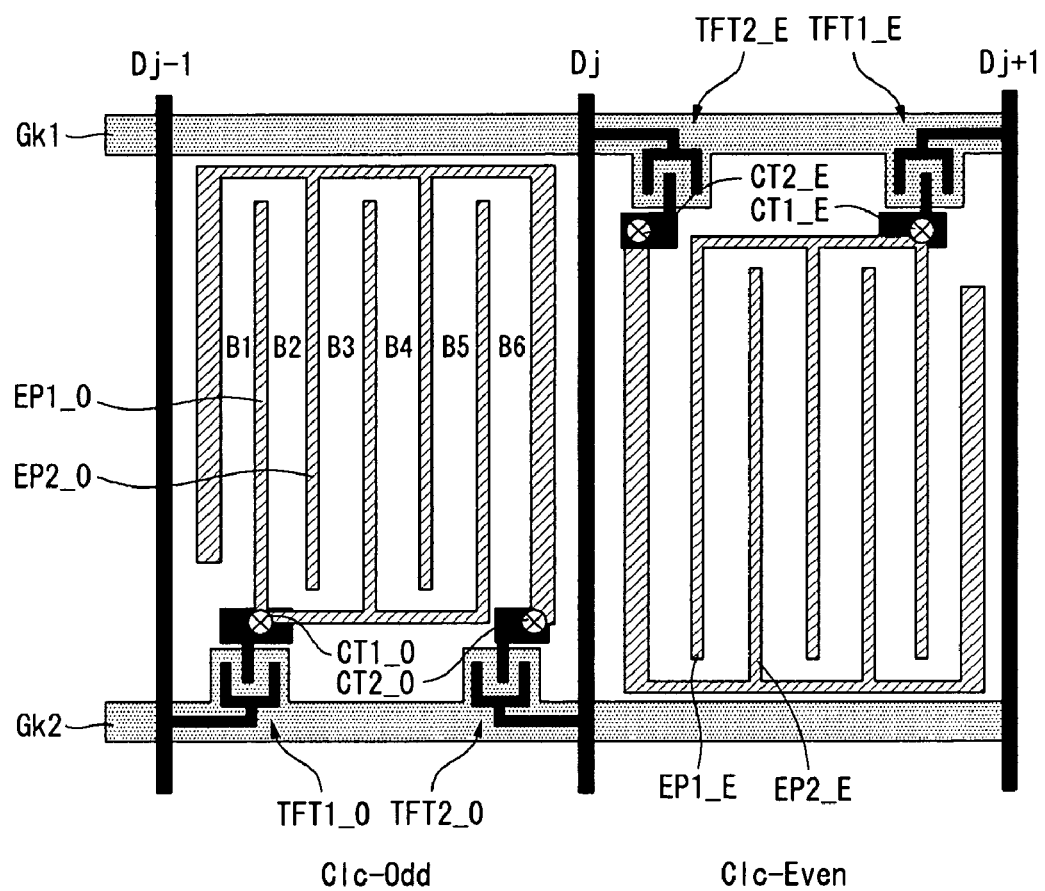
FIG. 4 illustrates a first implementation of a liquid crystal display panel in the horizontal electric field LCD according to the first exemplary embodiment of the invention.

FIG. 4 illustrates a first implementation of the liquid crystal display panel 11 in the horizontal electric field LCD according to the first exemplary embodiment of the invention. In FIG. 4, the number of opening blocks "B" in the liquid crystal cell is an even number. The opening blocks "B" is defined by a region between pixel electrodes inside the same liquid crystal cell.

As shown in FIG. 4, in the same horizontal line to which a pair of gate lines (Gk1, Gk2) are assigned, an odd-numbered liquid crystal cell Clc_Odd is driven by a voltage difference between first and second pixel electrodes EP1_O and EP2_O that oppose each other on the same plane. For this, the first pixel electrode EP1_O of the odd-numbered liquid crystal cell Clc_Odd includes a plurality of first finger units parallel to first to third data lines Dj−1 to Dj+1 and a first connection unit that is formed parallel to the pair of gate lines (Gk1, Gk2) to commonly connect the first finger units to one another. The first pixel electrode EP1_O is connected to a first TFT TFT1_O through a first contact hole CT1_O. The first TFT TFT1_O supplies a first analog data voltage from the first data line Dj−1 to the first pixel electrode EP1_O in response to a scan pulse from the second gate line Gk2. Further, the second pixel electrode EP2_O of the odd-numbered liquid crystal cell Clc_Odd includes a plurality of second finger units, that are formed parallel to the data lines Dj−1 to Dj+1 to respectively oppose the first finger units, and a second connection unit that is formed parallel to the pair of gate lines (Gk1, Gk2) to commonly connect the second finger units to one another. The second connection unit is positioned to be spaced apart from the first gate line Gk1 at a constant distance. The second pixel electrode EP2_O is connected to a second TFT TFT2_O through a second contact hole CT2_O. The second TFT TFT2_O supplies a second analog data voltage from the second data line Dj to the second pixel electrode EP2_O in response to a scan pulse from the second gate line Gk2.

Further, in the same horizontal line to which the pair of gate lines (Gk1, Gk2) are assigned, an even-numbered liquid crystal cell Clc_Even is driven by a voltage difference between first and second pixel electrodes EP1_E and EP2_E that oppose each other on the same plane. For this, the first pixel electrode EP1_E of the even-numbered liquid crystal cell Clc_Even includes a plurality of first finger units parallel to the data lines Dj−1 to Dj+1 and a first connection unit that is formed parallel to the pair of gate lines (Gk1, Gk2) to commonly connect the first finger units to one another. The first pixel electrode EP1_E is connected to a first TFT TFT1_E through a first contact hole CT1_E. The first TFT TFT1_E supplies a third analog data voltage from the third data line Dj+1 to the first pixel electrode EP1_E in response to a scan pulse from the first gate line Gk1. Further, the second pixel electrode EP2_E of the even-numbered liquid crystal cell Clc_Even includes a plurality of second finger units, that are formed parallel to the data lines Dj−1 to Dj+1 to respectively oppose the first finger units, and a second connection unit that is formed parallel to the pair of gate lines (Gk1, Gk2) to commonly connect the second finger units to one another. The second connection unit is positioned to be spaced apart from the first gate line Gk1 at a constant distance. The second pixel electrode EP2_E is connected to a second TFT TFT2_E through a second contact hole CT2_E. The second TFT TFT2_E supplies a fourth analog data voltage from the second data line Dj to the second pixel electrode EP2_E in response to a scan pulse from the first gate line Gk1.

Figure 5:
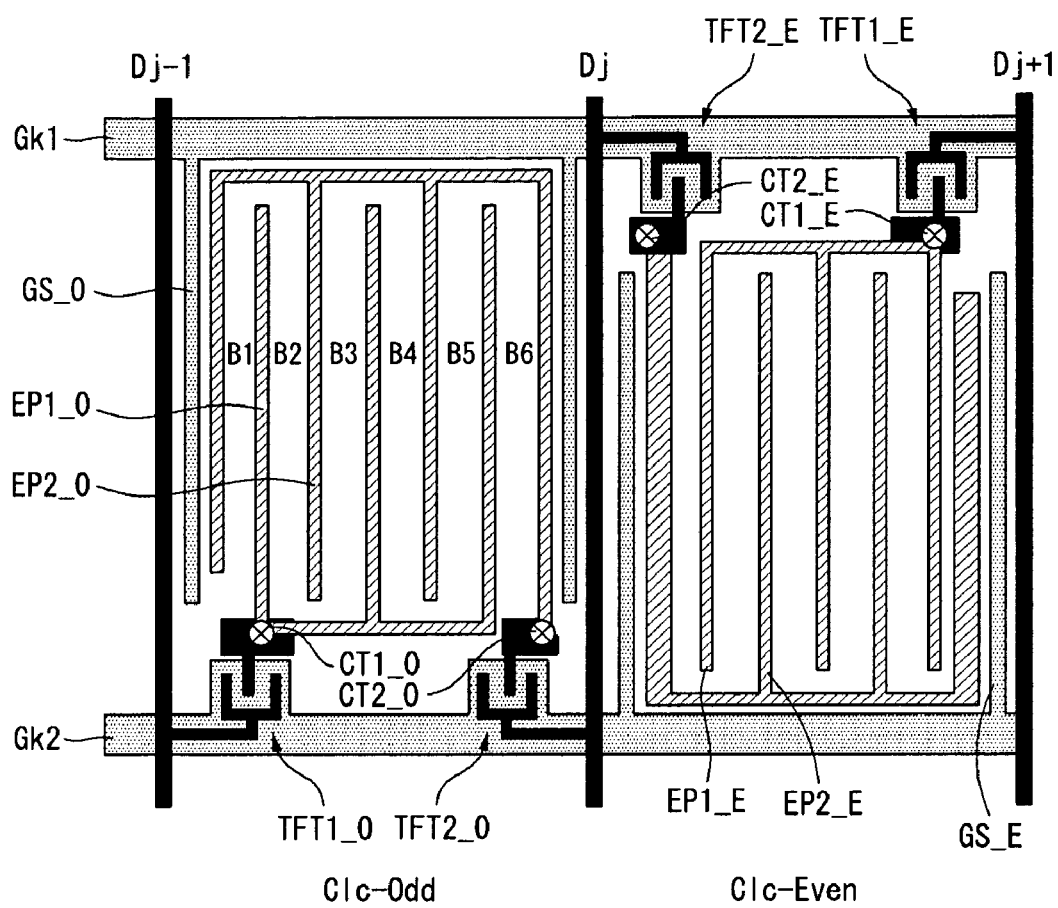
FIG. 5 illustrates a second implementation of the liquid crystal display panel in the horizontal electric field LCD according to the first exemplary embodiment of the invention.

FIG. 5 illustrates a second implementation of the liquid crystal display panel 11 including a gate shield pattern in the horizontal electric field LCD according to the first exemplary embodiment of the invention. In FIG. 5, the number of opening blocks "B" in the liquid crystal cell is an even number.

Since a configuration of the liquid crystal display panel 11 according to the second implementation shown in FIG. 5 is substantially the same as the liquid crystal display panel 11 according to the first implementation shown in FIG. 4 except that the liquid crystal display panel 11 further includes the gate shield pattern, a further description may be briefly made or may be entirely omitted.

An odd-numbered liquid crystal cell Clc_Odd of the liquid crystal display panel 11 further includes two gate shield patterns GS_O. The two gate shield patterns GS_O downwardly project from a first gate line Gk1 and are respectively spaced apart from outermost finger units at both sides of a second pixel electrode EP2_O. The gate shield patterns GS_O shield parasitic capacitances Cdp respectively generated between data lines Dj−1 and Dj and the second pixel electrode EP2_O to prevent a voltage of the second pixel electrode EP2_O from changing due to changes in voltages of the data lines Dj−1 and Dj.

An even-numbered liquid crystal cell Clc_Even of the liquid crystal display panel 11 further includes two gate shield patterns GS_E. The two gate shield patterns GS_E upwardly project from a second gate line Gk2 and are respectively spaced apart from outermost finger units at both sides of a second pixel electrode EP2_E. The gate shield patterns GS_E shield parasitic capacitances Cdp respectively generated between data lines Dj and Dj+1 and the second pixel electrode EP2_E to prevent a voltage of the second pixel electrode EP2_E from changing due to changes in voltages of the data lines Dj and Dj+1.

Figure 6:
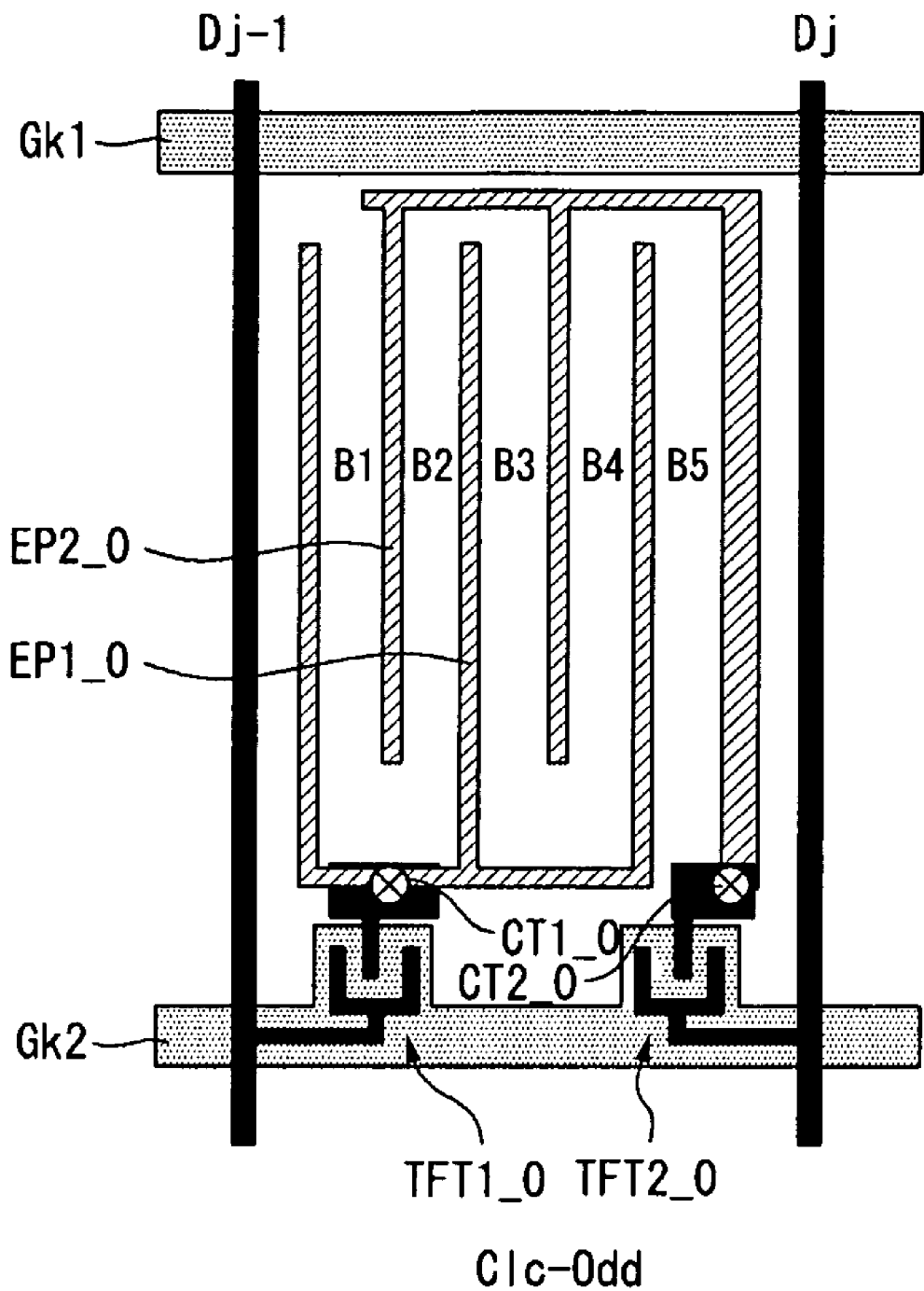
FIGS. 6 and 7 illustrate a third implementation of the liquid crystal display panel in the horizontal electric field LCD according to the first exemplary embodiment of the invention.
Figure 7:
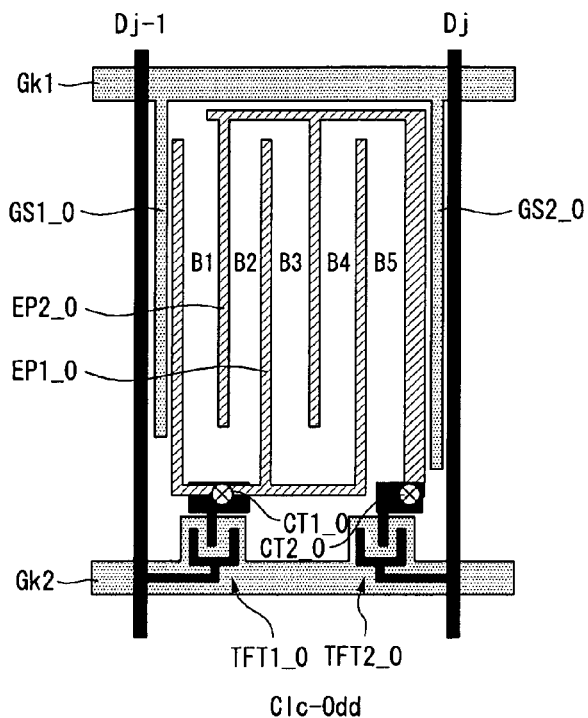
Figure 8:
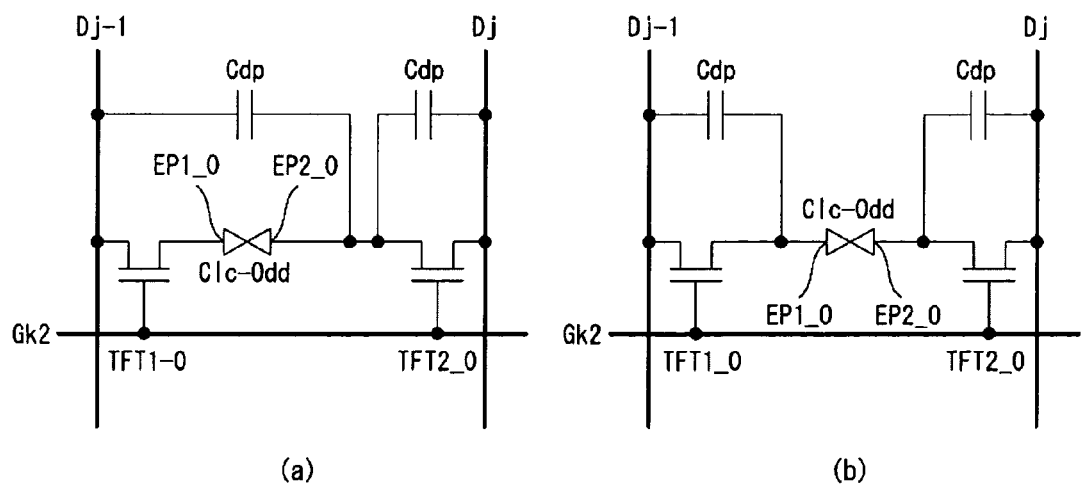
FIG. 8 illustrates an equivalent circuit generated when the number of opening blocks in a liquid crystal cell is an even number and an equivalent circuit generated when the number of opening blocks in a liquid crystal cell is an odd number.

FIGS. 6 and 7 illustrate a third implementation of the liquid crystal display panel 11 in the horizontal electric field LCD according to the first exemplary embodiment of the invention. In FIGS. 6 and 7, the number of opening blocks "B" in the liquid crystal cell is an odd number. FIG. 8 illustrates an equivalent circuit generated when the number of opening blocks "B" in the liquid crystal cell is an even number and an equivalent circuit generated when the number of opening blocks "B" in the liquid crystal cell is an odd number.

Structures of first and second pixel electrodes EP1_O and EP2_O of an odd-numbered liquid crystal cell Clc_Odd, in which the number of opening blocks "B" is an odd number, shown in FIG. 6 are different from structures of the first and second pixel electrodes EP1_O and EP2_O of the odd-numbered liquid crystal cell Clc_Odd, in which the number of opening blocks "B" is an even number, shown in FIG. 4. More specifically, as shown in FIG. 4, in the odd-numbered liquid crystal cell Clc_Odd, in which the number of opening blocks "B" is an even number, the number of finger units in the second pixel electrode EP2_O is more than the number of finger units in the first pixel electrode EP1_O. On the other hand, as shown in FIG. 6, in the odd-numbered liquid crystal cell Clc_Odd, in which the number of opening blocks "B" is an odd number, the number of finger units in the first pixel electrode EP1_O is equal to the number of finger units in the second pixel electrode EP2_O. Hence, as shown in (b) of FIG. 8, in the odd-numbered liquid crystal cell Clc_Odd, in which the number of opening blocks "B" is an odd number, an influence of a parasitic capacitance Cdp between the data line and the pixel electrode is symmetrically distributed into the first and second pixel electrodes EP1_O and EP2_O. On the other hand, as shown in (a) of FIG. 8, in the odd-numbered liquid crystal cell Clc_Odd, in which the number of opening blocks "B" is an even number, an influence of a parasitic capacitance Cdp between the data line and the pixel electrode is concentrated on the second pixel electrode EP2_O. Accordingly, the equivalent circuit shown in (b) of FIG. 8 is more advantageous than the equivalent circuit shown in (a) of FIG. 8 in a drive stability.

Structures of first and second pixel electrodes EP1_O and EP2_O of an odd-numbered liquid crystal cell Clc_Odd, in which the number of opening blocks "B" is an odd number, shown in FIG. 7 are different from structures of the first and second pixel electrodes EP1_O and EP2_O of the odd-numbered liquid crystal cell Clc_Odd, in which the number of opening blocks "B" is an even number, shown in FIG. 5. More specifically, as shown in FIG. 5, in the odd-numbered liquid crystal cell Clc_Odd, in which the number of opening blocks "B" is an even number, the number of finger units in the second pixel electrode EP2_O is more than the number of finger units in the first pixel electrode EP1_O. On the other hand, as shown in FIG. 7, in the odd-numbered liquid crystal cell Clc_Odd, in which the number of opening blocks "B" is an odd number, the number of finger units in the first pixel electrode EP1_O is equal to the number of finger units in the second pixel electrode EP2_O. In FIG. 7, a first gate shield pattern GS1_O downwardly projects from a first gate line Gk1 and is spaced apart from an outermost finger unit of the first pixel electrode EP1_O. The first gate shield pattern GS1_O shields a parasitic capacitance Cdp generated between a first data line Dj−1 and the first pixel electrode EP1_O to prevent a voltage of the first pixel electrode EP1_O from changing due to changes in voltages of the first data line Dj−1. Further, a second gate shield pattern GS2_O downwardly projects from the first gate line Gk1 and is spaced apart from an outermost finger unit of the second pixel electrode EP2_O. The second gate shield pattern GS2_O shields a parasitic capacitance Cdp generated between a second data line Dj and the second pixel electrode EP2_O to prevent a voltage of the second pixel electrode EP2_O from changing due to changes in voltages of the second data line Dj. As shown in (b) of FIG. 8, in the odd-numbered liquid crystal cell Clc_Odd, in which the number of opening blocks "B" is an odd number, the parasitic capacitance Cdp may be symmetrically shielded. On the other hand, as shown in (a) of FIG. 8, in the odd-numbered liquid crystal cell Clc_Odd, in which the number of opening blocks "B" is an even number, the parasitic capacitance Cdp may be asymmetrically shielded. Accordingly, the equivalent circuit shown in (b) of FIG. 8 is more advantageous than the equivalent circuit shown in (a) of FIG. 8 in a drive stability.

Whether the number of opening blocks "B" is an even number or an odd number may be determined depending on an aperture ratio, changes in a pixel design, changes in a voltage of the pixel electrode resulting from the parasitic capacitance between the data line and the pixel electrode, and the like. FIGS. 6 to 8 illustrate the odd-numbered liquid crystal cell Clc_Odd for convenience of explanation, but configurations illustrated in FIGS. 6 to 8 may be applied to the even-numbered liquid crystal cell Clc_Even.

Figure 9:
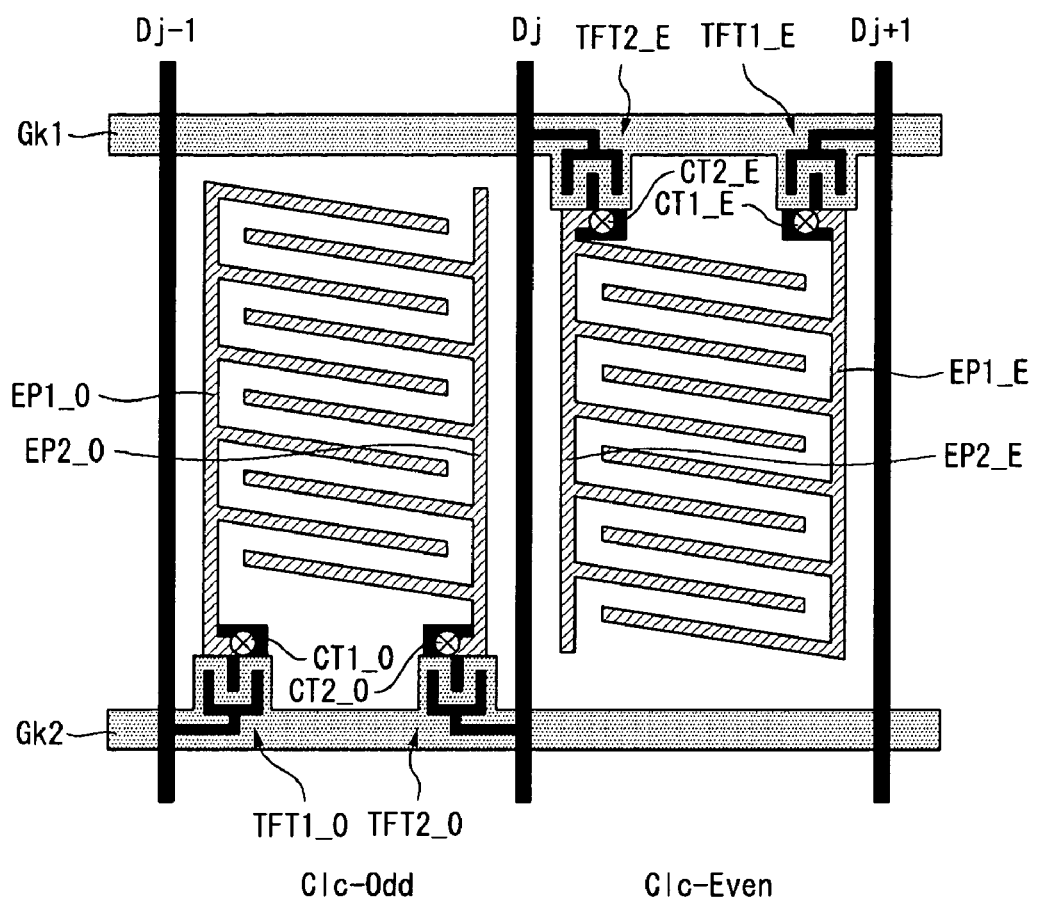
FIGS. 9 and 10 illustrate a fourth implementation of the liquid crystal display panel in the horizontal electric field LCD according to the first exemplary embodiment of the invention.
Figure 10:
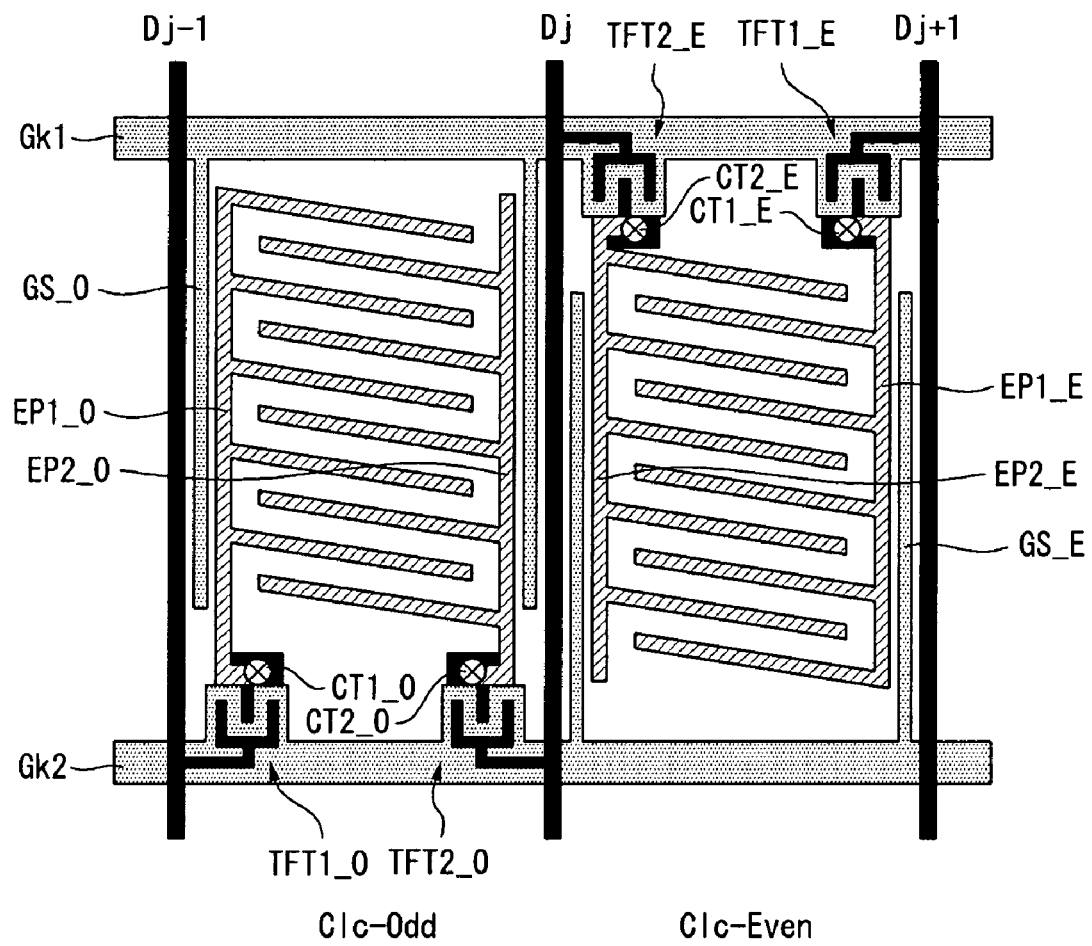

FIGS. 9 and 10 illustrate a fourth implementation of the liquid crystal display panel 11 in the horizontal electric field LCD according to the first exemplary embodiment of the invention. FIGS. 4 and 5 illustrate the liquid crystal display panel 11 operating in a super in-plane switching (S_IPS) mode, and FIGS. 9 and 10 illustrate the liquid crystal display panel 11 operating in a horizontal in-plane switching (H_IPS) mode.

The liquid crystal display panel 11 operating in the H_IPS mode shown in FIGS. 9 and 10 is driven by a voltage difference between first and second pixel electrodes that oppose each other on the same plane. Therefore, a configuration of the liquid crystal display panel 11 according to the fourth implementation shown in FIGS. 9 and 10 is substantially the same as the liquid crystal display panel 11 according to the first implementation shown in FIGS. 4 and 5 except locations and formation angles of finger units and a connection unit. A further description may be briefly made or may be entirely omitted.

As shown in FIG. 9, in the same horizontal line to which a pair of gate lines (Gk1, Gk2) are assigned, a first pixel electrode EP1_O of an odd-numbered liquid crystal cell Clc_Odd includes a plurality of first finger units inclining to the gate lines Gk1 and Gk2 and a first connection unit that is formed parallel to data lines Dj−1 to Dj+1 to commonly connect the first finger units to one another. A second pixel electrode EP2_O of the odd-numbered liquid crystal cell Clc_Odd includes a plurality of second finger units, that incline to the gate lines Gk1 and Gk2 to respectively oppose the first finger units, and a second connection unit that is formed parallel to the data lines Dj−1 to Dj+1 to commonly connect the second finger units to one another.

Further, in the same horizontal line to which the pair of gate lines (Gk1, Gk2) are assigned, a first pixel electrode EP1_E of an even-numbered liquid crystal cell Clc_Even includes a plurality of first finger units inclining to the gate lines Gk1 and Gk2 and a first connection unit that is formed parallel to the data lines Dj−1 to Dj+1 to commonly connect the first finger units to one another. A second pixel electrode EP2_E of the even-numbered liquid crystal cell Clc_Even includes a plurality of second finger units, that incline to the gate lines Gk1 and Gk2 to respectively oppose the first finger units, and a second connection unit that is formed parallel to the data lines Dj−1 to Dj+1 to commonly connect the second finger units to one another.

As shown in FIG. 10, in odd-numbered and even-numbered liquid crystal cells Clc_Odd and Clc_Even, because pixel electrodes are spaced apart from gate lines and/or gate shield patterns, the pixel electrodes do not overlap the gate shield patterns. More specifically, in the odd-numbered liquid crystal cell Clc_Odd, finger units of each of first and second pixel electrodes EP1_O and EP2_O are spaced apart from a first gate line Gk1, and a connection unit of each of the first and second pixel electrodes EP1_O and EP2_O is spaced apart from a gate shield pattern GS_O. Further, in the even-numbered liquid crystal cell Clc_Even, finger units of each of first and second pixel electrodes EP1_E and EP2_E are spaced apart from a second gate line Gk2, and a connection unit of each of the first and second pixel electrodes EP1_E and EP2_E is spaced apart from a gate shield pattern GS_O.

Figure 11A:
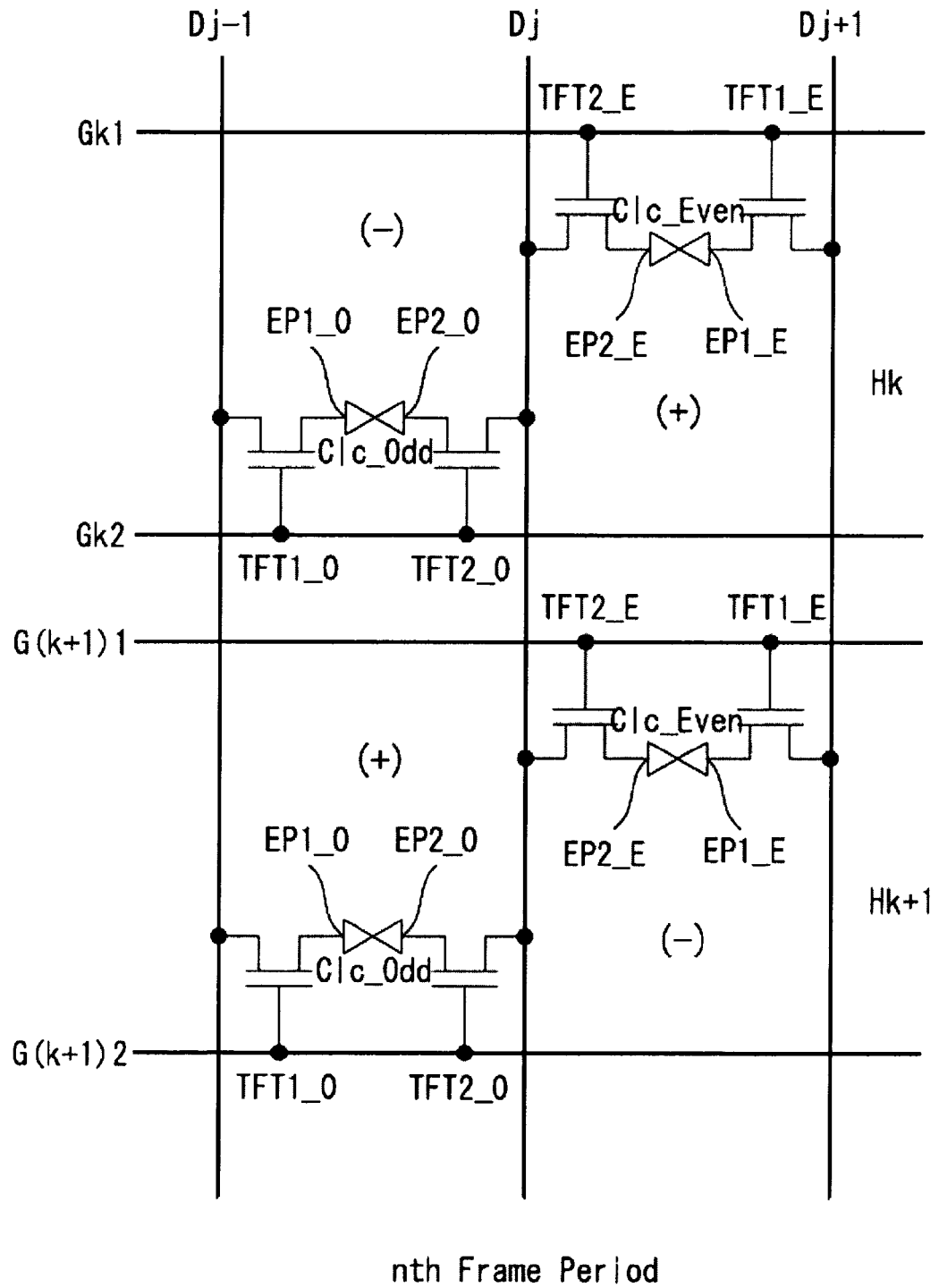
FIGS. 11A and 11B are equivalent circuit diagrams illustrating a driving operation of the horizontal electric field LCD according to the first exemplary embodiment of the invention.
Figure 11B:
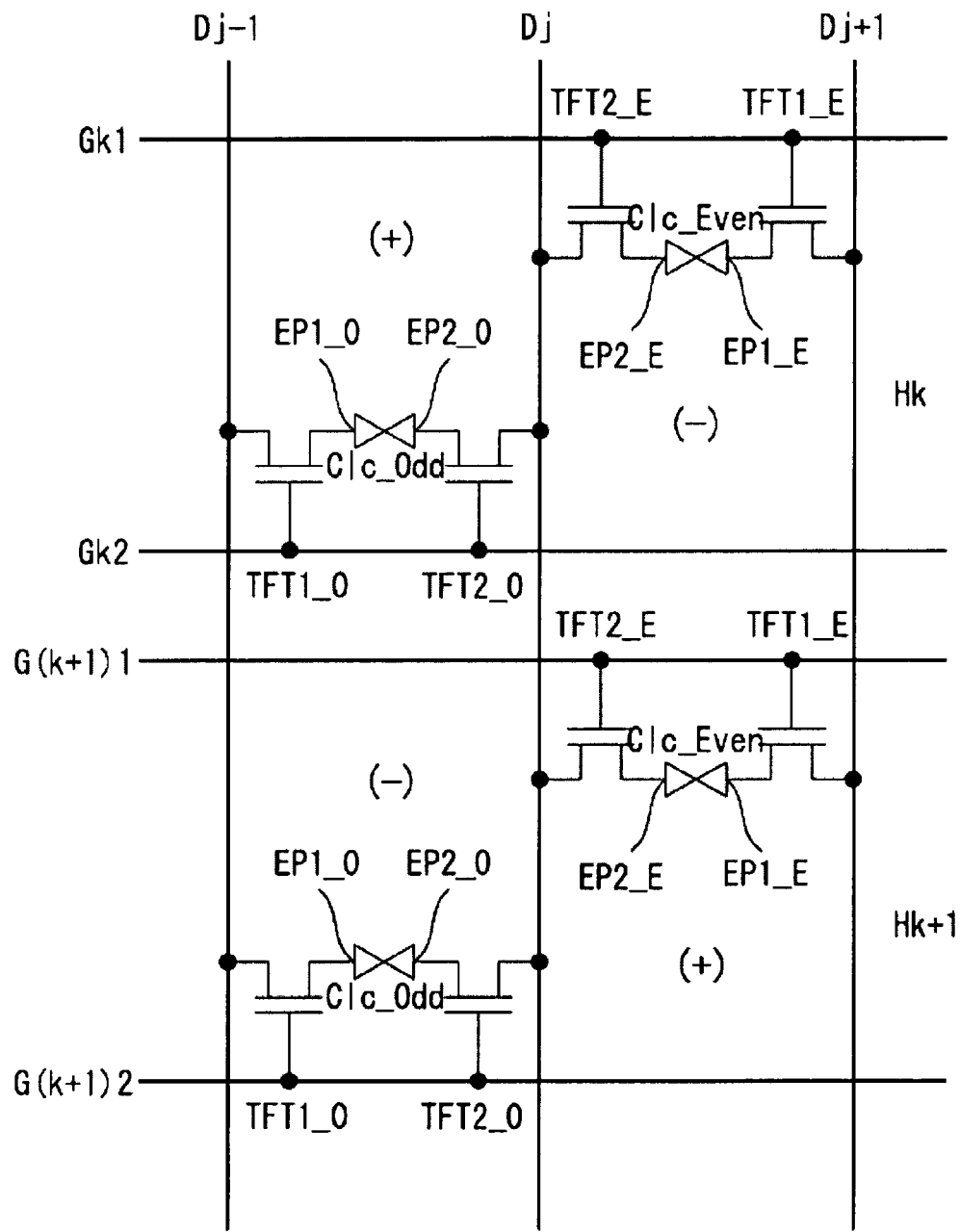

A driving operation of the horizontal electric field LCD according to the first exemplary embodiment of the invention is described below with reference to FIGS. 11A and 11B. In FIGS. 11A and 11B, it is assumed that each liquid crystal cell represents the same gray level during n-th and (n+1)-th frame periods.

As shown in FIG. 11A, during an n-th frame period, an even-numbered liquid crystal cell Clc_Even on a k-th horizontal line Hk is charged to a first polarity (a positive polarity) due to a voltage difference between first and second pixel electrodes EP1_E and EP2_E in response to a scan pulse from a 1-1 gate line Gk1 during a first half of 1 horizontal period, and then an odd-numbered liquid crystal cell Clc_Odd on the k-th horizontal line Hk is charged to a second polarity (a negative polarity) due to a voltage difference between first and second pixel electrodes EP1_O and EP2_O in response to a scan pulse from a 1-2 gate line Gk2 during a second half of 1 horizontal period. Further, during the n-th frame period, an even-numbered liquid crystal cell Clc_Even on a (k+1)-th horizontal line H(k+1) is charged to the second polarity (a negative polarity) due to a voltage difference between first and second pixel electrodes EP1_E and EP2_E in response to a scan pulse from a 2-1 gate line G(k+1)1 during a first half of 1 horizontal period, and then an odd-numbered liquid crystal cell Clc_Odd on the (k+1)-th horizontal line H(k+1) is charged to the first polarity (a positive polarity) due to a voltage difference between first and second pixel electrodes EP1_O and EP2_O in response to a scan pulse from a 2-2 gate line G(k+1)2 during a second half of 1 horizontal period.

As shown in FIG. 11B, during an (n+1)-th frame period, the even-numbered liquid crystal cell Clc_Even on the k-th horizontal line Hk is charged to the second polarity (−) due to a voltage difference between the first and second pixel electrodes EP1_E and EP2_E in response to a scan pulse from the 1-1 gate line Gk1 during a first half of 1 horizontal period, and then the odd-numbered liquid crystal cell Clc_Odd on the k-th horizontal line Hk is charged to the first polarity (+) due to a voltage difference between the first and second pixel electrodes EP1_O and EP2_O in response to a scan pulse from the 1-2 gate line Gk2 during a second half of 1 horizontal period. An absolute value of the voltage difference between the first and second pixel electrodes EP1_E and EP2_E during the (n+1)-th frame period is equal to an absolute value of the voltage difference between the first and second pixel electrodes EP1_E and EP2_E during the n-th frame period. Merely, polarities of the voltage differences are opposite to each other. Further, an absolute value of the voltage difference between the first and second pixel electrodes EP1_O and EP2_O during the (n+1)-th frame period is equal to an absolute value of the voltage difference between the first and second pixel electrodes EP1_O and EP2_O during the n-th frame period. Merely, polarities of the voltage differences are opposite to each other. Accordingly, in an inversion scheme, non-uniformity of charge amounts of each of the even-numbered and odd-numbered liquid crystal cells Clc_Even and Clc_Odd on the k-th horizontal line Hk during frame periods is solved.

Further, during the (n+1)-th frame period, the even-numbered liquid crystal cell Clc_Even on the (k+1)-th horizontal line H(k+1) is charged to the first polarity (+) due to a voltage difference between the first and second pixel electrodes EP1_E and EP2_E in response to a scan pulse from the 2-1 gate line G(k+1)1 during a first half of 1 horizontal period, and then the odd-numbered liquid crystal cell Clc_Odd on the (k+1)-th horizontal line H(k+1) is charged to the second polarity (−) due to a voltage difference between the first and second pixel electrodes EP1_O and EP2_O in response to a scan pulse from the 2-2 gate line G(k+1)2 during a second half of 1 horizontal period. An absolute value of the voltage difference between the first and second pixel electrodes EP1_E and EP2_E during the (n+1)-th frame period is equal to an absolute value of the voltage difference between the first and second pixel electrodes EP1_E and EP2_E during the n-th frame period. Merely, polarities of the voltage differences are opposite to each other. Further, an absolute value of the voltage difference between the first and second pixel electrodes EP1_O and EP2_O during the (n+1)-th frame period is equal to an absolute value of the voltage difference between the first and second pixel electrodes EP1_O and EP2_O during the n-th frame period. Merely, polarities of the voltage differences are opposite to each other. Accordingly, in an inversion scheme, non-uniformity of charge amounts of each of the even-numbered and odd-numbered liquid crystal cells Clc_Even and Clc_Odd on the (k+1)-th horizontal line H(k+1) during frame periods is solved.

Figure 12A:
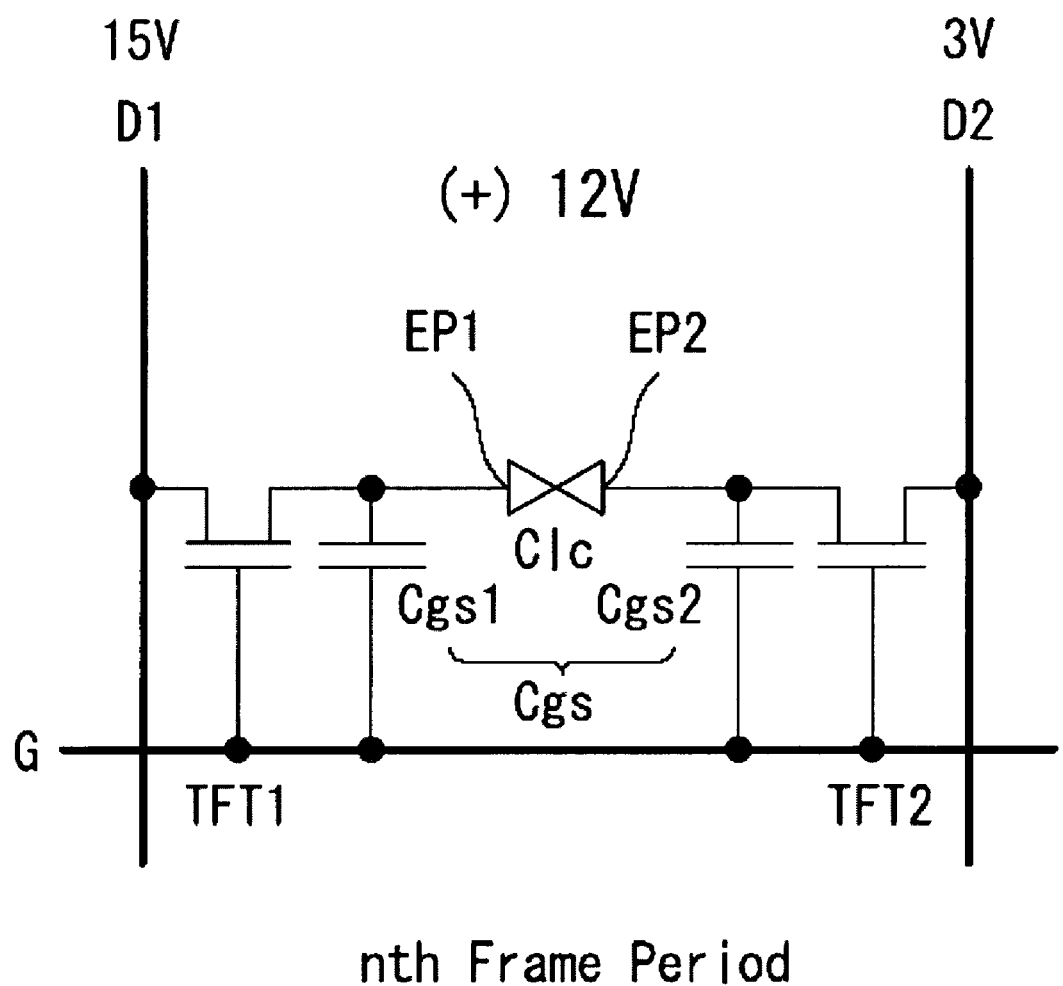
FIGS. 12A and 12B are diagrams for explaining a principal in which a difference between charging voltages of a liquid crystal cell during frame periods resulting from a parasitic capacitance between a gate electrode and a source electrode of a TFT is cancelled.
Figure 12B:
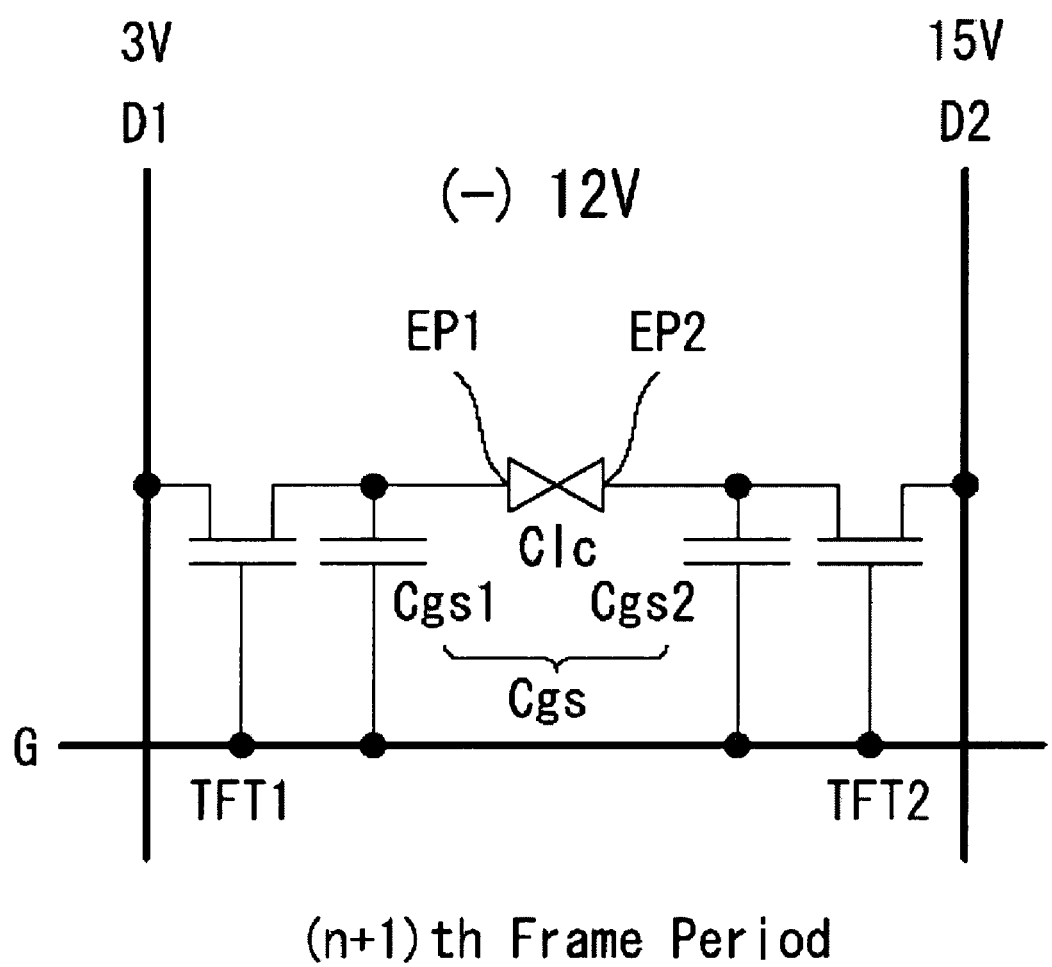

FIGS. 12A and 12B are diagrams for explaining a principal in which a difference between charging voltages of the same liquid crystal cell during frame periods resulting from a parasitic capacitance between a gate electrode and a source electrode of the TFT is cancelled. In FIGS. 12A and 12B, Cgs1 indicates a parasitic capacitor between a gate electrode and a source electrode of a first TFT TFT1, and Cgs2 indicates a parasitic capacitor between a gate electrode and a source electrode of a second TFT TFT2.

In FIGS. 12A and 12B, it is assumed that the liquid crystal cell represents a gray voltage of 12V during an n-th frame period and represents a gray voltage of −12V during an (n+1)-th frame period. For example, a first data line D1 receives a data voltage of 15V during the n-th frame period and then a data voltage of 3V during the (n+1)-th frame period. A second data line D2 receives a data voltage of 3V during the n-th frame period and then a data voltage of 15V during the (n+1)-th frame period. Hence, the parasitic capacitor Cgs1 has a difference voltage 10V between gate high voltage 25V and data voltage 15V during the n-th frame period and has a difference voltage 22V between gate high voltage 25V and data voltage 3V during the (n+1)-th frame period. The parasitic capacitor Cgs2 has a difference voltage 22V between gate high voltage 25V and data voltage 3V during the n-th frame period and has a difference voltage 10V between gate high voltage 25V and data voltage 10V during the (n+1)-th frame period. Accordingly, because a difference (−12V) between charging voltages of the parasitic capacitor Cgs1 and a difference (12V) between charging voltages of the parasitic capacitor Cgs2 during the n-th and (n+1)-th frame periods are cancelled with each other, there is no difference between the charge amounts of all the parasitic capacitors during the n-th and (n+1)-th frame periods in the liquid crystal cell. Hence, a difference between feed through voltages ΔVp during the n-th and (n+1)-th frame periods is reduced. Further, non-uniformity of charge amounts of the liquid crystal cell during the n-th and (n+1)-th frame periods is greatly solved. A large-capacity storage capacitor was formed to solve non-uniformity of charge amounts of the liquid crystal cell during frame periods in the related art, but the storage capacitor may be omitted in the first exemplary embodiment.

As described above, in the horizontal electric field LCD according to the first exemplary embodiment of the invention, because a common electrode is removed and the liquid crystal cell is driven due to a voltage difference between the pixel electrodes using the two TFTs, there is no difference between positive and negative feed through voltages ΔVp in the inversion scheme. Hence, the non-uniformity of charge amounts of the same liquid crystal cell during frame periods can be solved, and the deterioration of the image quality can be prevented. Further, because a separate storage capacitor as well as the common electrode may be omitted, the aperture ratio can greatly increase. Furthermore, in the horizontal electric field LCD according to the first exemplary embodiment of the invention, because liquid crystal cells on the same horizontal line are divided into odd-numbered liquid crystal cells and even-numbered liquid crystal cells using two gate lines and are driven, a load amount of the gate lines can be reduced. In the horizontal electric field LCD according to the first exemplary embodiment of the invention, because a source voltage of a high potential input to the data drive circuit can be used as a liquid crystal driving voltage, power consumption of the data drive circuit can be greatly reduced as compared with the related art demanding a high potential driving voltage that is higher than 2 times the liquid crystal driving voltage.

Second Exemplary Embodiment

FIGS. 13 to 20B illustrate a horizontal electric field liquid crystal display (LCD) according to a second exemplary embodiment of the invention.

Figure 13:
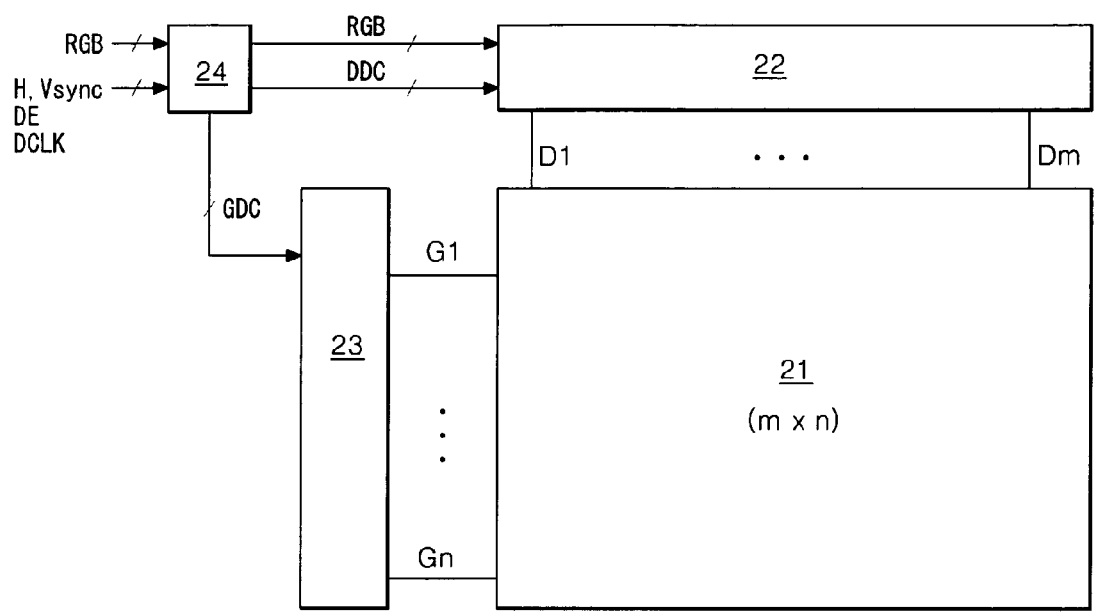
FIG. 13 is a block diagram showing a horizontal electric field LCD according to a second exemplary embodiment of the invention.

As shown in FIG. 13, the horizontal electric field LCD according to the second exemplary embodiment of the invention includes a liquid crystal display panel 21, a data drive circuit 22, a gate drive circuit 23, and a timing controller 24.

Since configurations and operations of the data drive circuit 22, the gate drive circuit 23, and the timing controller 24 are substantially the same as those illustrated in the first exemplary embodiment, a further description may be briefly made or may be entirely omitted.

The liquid crystal display panel 21 includes an upper glass substrate, a lower glass substrate, and a liquid crystal layer between the upper and lower glass substrates. The liquid crystal display panel 21 includes m×n liquid crystal cells Clc arranged in a matrix format at each crossing of m data lines D1 to Dm and n gate lines G1 to Gn. Namely, one data line and one gate line are assigned to each liquid crystal cell Clc.

A black matrix and a color filter are formed on the upper glass substrate of the liquid crystal display panel 21. The data lines D1 to Dm, the gate lines G1 to Gn, thin film transistors (TFTs), and a storage capacitor are formed on the lower glass substrate of the liquid crystal display panel 21. Polarizing plates are attached respectively to the upper and lower glass substrates. Alignment layers for setting a pre-tilt angle of liquid crystals are respectively formed on the upper and lower glass substrates.

Figure 14:
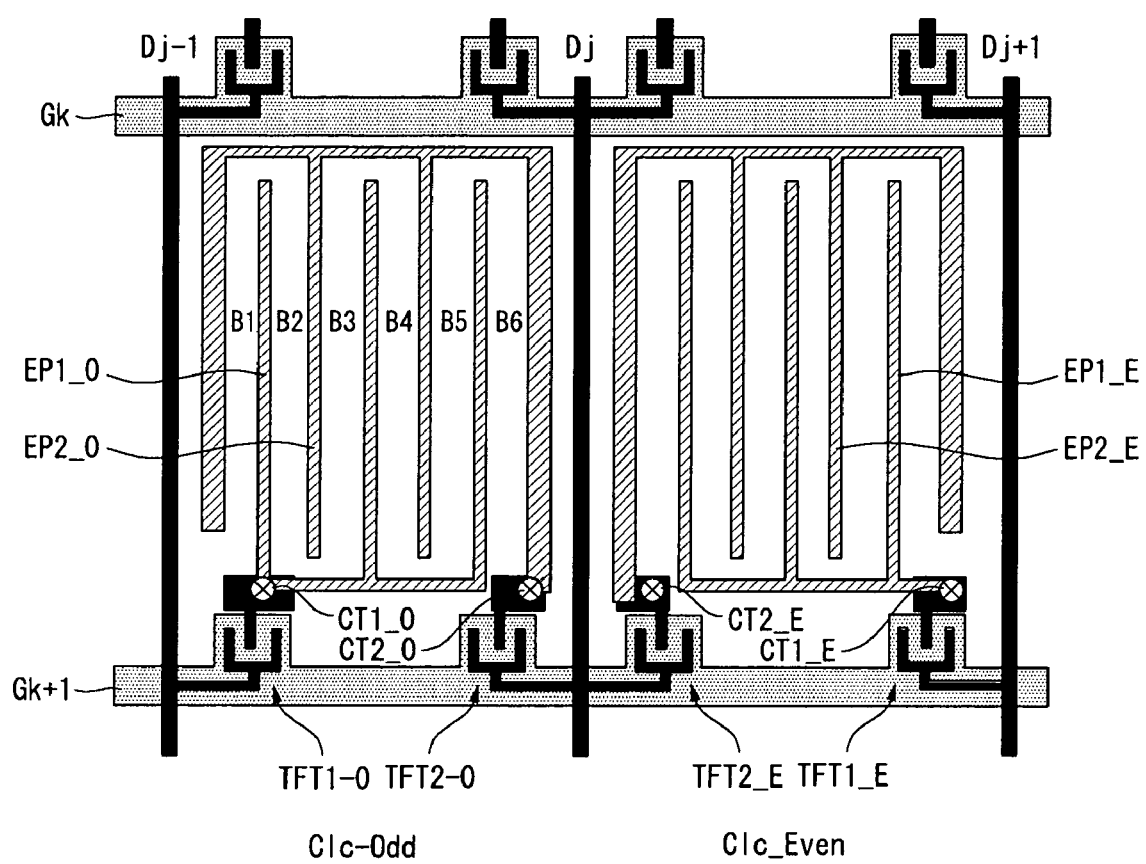
FIG. 14 illustrates a first implementation of a liquid crystal display panel in the horizontal electric field LCD according to the second exemplary embodiment of the invention.

FIG. 14 illustrates a first implementation of the liquid crystal display panel 21 in the horizontal electric field LCD according to the second exemplary embodiment of the invention. In FIG. 14, the number of opening blocks "B" in the liquid crystal cell is an even number.

As shown in FIG. 14, in the same horizontal line to which a second gate line G(k+1) is assigned, an odd-numbered liquid crystal cell Clc_Odd is driven by a horizontal electric field between first and second pixel electrodes EP1_O and EP2_O that oppose each other on the same plane. For this, the first pixel electrode EP1_O of the odd-numbered liquid crystal cell Clc_Odd includes a plurality of first finger units parallel to first to third data lines Dj−1 to Dj+1 and a first connection unit that is formed parallel to gate lines Gk and G(k+1) to commonly connect the first finger units to one another. The first pixel electrode EP1_O is connected to a first TFT TFT1_O through a first contact hole CT1_O. The first TFT TFT1_O supplies a first analog data voltage from the first data line Dj−1 to the first pixel electrode EP1_O in response to a scan pulse from the second gate line G(k+1). Further, the second pixel electrode EP2_O of the odd-numbered liquid crystal cell Clc_Odd includes a plurality of second finger units, that are formed parallel to the data lines Dj−1 to Dj+1 to respectively oppose the first finger units, and a second connection unit that is formed parallel to the gate lines Gk and G(k+1) to commonly connect the second finger units to one another. The second connection unit is positioned to be spaced apart from the first gate line Gk at a constant distance. The second pixel electrode EP2_O is connected to a second TFT TFT2_O through a second contact hole CT2_O. The second TFT TFT2_O supplies a second analog data voltage from the second data line Dj to the second pixel electrode EP2_O in response to a scan pulse from the second gate line G(k+1).

Further, in the same horizontal line to which the second gate line G(k+1) is assigned, an even-numbered liquid crystal cell Clc_Even is driven by a horizontal electric field between first and second pixel electrodes EP1_E and EP2_E that oppose each other on the same plane. For this, the first pixel electrode EP1_E of the even-numbered liquid crystal cell Clc_Even includes a plurality of first finger units parallel to the data lines Dj−1 to Dj+1 and a first connection unit that is formed parallel to the gate lines Gk and G(k+1) to commonly connect the first finger units to one another. The first pixel electrode EP1_E is connected to a first TFT TFT1_E through a first contact hole CT1_E. The first TFT TFT1_E supplies a third analog data voltage from the third data line Dj+1 to the first pixel electrode EP1_E in response to a scan pulse from the second gate line G(k+1). Further, the second pixel electrode EP2_E of the even-numbered liquid crystal cell Clc_Even includes a plurality of second finger units, that are formed parallel to the data lines Dj−1 to Dj+1 to respectively oppose the first finger units, and a second connection unit that is formed parallel to the gate lines Gk and G(k+1) to commonly connect the second finger units to one another. The second pixel electrode EP2_E is connected to a second TFT TFT2_E through a second contact hole CT2_E. The second TFT TFT2_E supplies a fourth analog data voltage from the second data line Dj to the second pixel electrode EP2_E in response to a scan pulse from the second gate line G(k+1).

Figure 15:
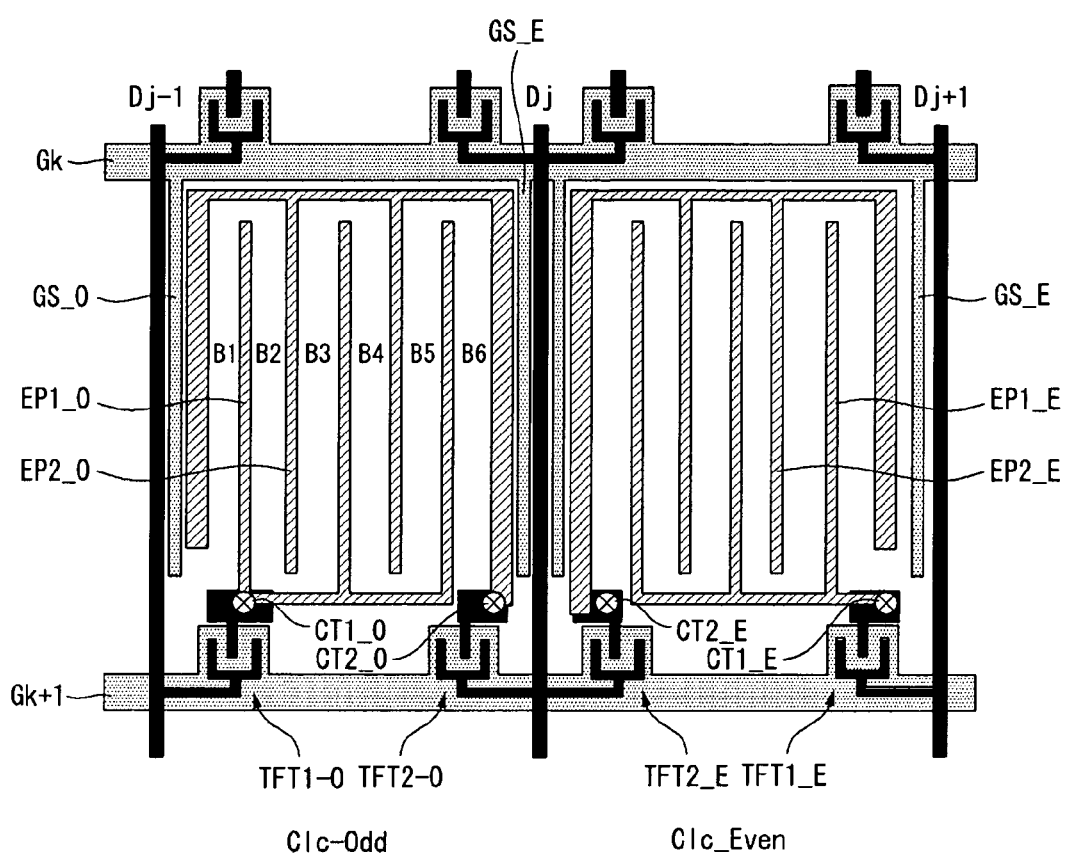
FIG. 15 illustrates a second implementation of the liquid crystal display panel in the horizontal electric field LCD according to the second exemplary embodiment of the invention.

FIG. 15 illustrates a second implementation of the liquid crystal display panel 211 including a gate shield pattern in the horizontal electric field LCD according to the second exemplary embodiment of the invention. In FIG. 15, the number of opening blocks "B" in the liquid crystal cell is an even number.

Since a configuration of the liquid crystal display panel 21 according to the second implementation shown in FIG. 15 is substantially the same as the liquid crystal display panel 21 according to the first implementation shown in FIG. 14 except that the liquid crystal display panel 21 further includes the gate shield pattern, a further description may be briefly made or may be entirely omitted.

An odd-numbered liquid crystal cell Clc_Odd of the liquid crystal display panel 21 further includes two gate shield patterns GS_O. The two gate shield patterns GS_O downwardly project from a first gate line Gk and are respectively spaced apart from outermost finger units at both sides of a second pixel electrode EP2_O. The gate shield patterns GS_O shield parasitic capacitances Cdp respectively generated between data lines Dj−1 and Dj and the second pixel electrode EP2_O to prevent a voltage of the second pixel electrode EP2_O from changing due to changes in voltages of the data lines Dj−1 and Dj.

An even-numbered liquid crystal cell Clc_Even of the liquid crystal display panel 21 further includes two gate shield patterns GS_E. The two gate shield patterns GS_E downwardly project from the first gate line Gk and are respectively spaced apart from outermost finger units at both sides of a second pixel electrode EP2_E. The gate shield patterns GS_E shield parasitic capacitances Cdp respectively generated between data lines Dj and Dj+1 and the second pixel electrode EP2_E to prevent a voltage of the second pixel electrode EP2_E from changing due to changes in voltages of the data lines Dj and Dj+1.

Figure 16:
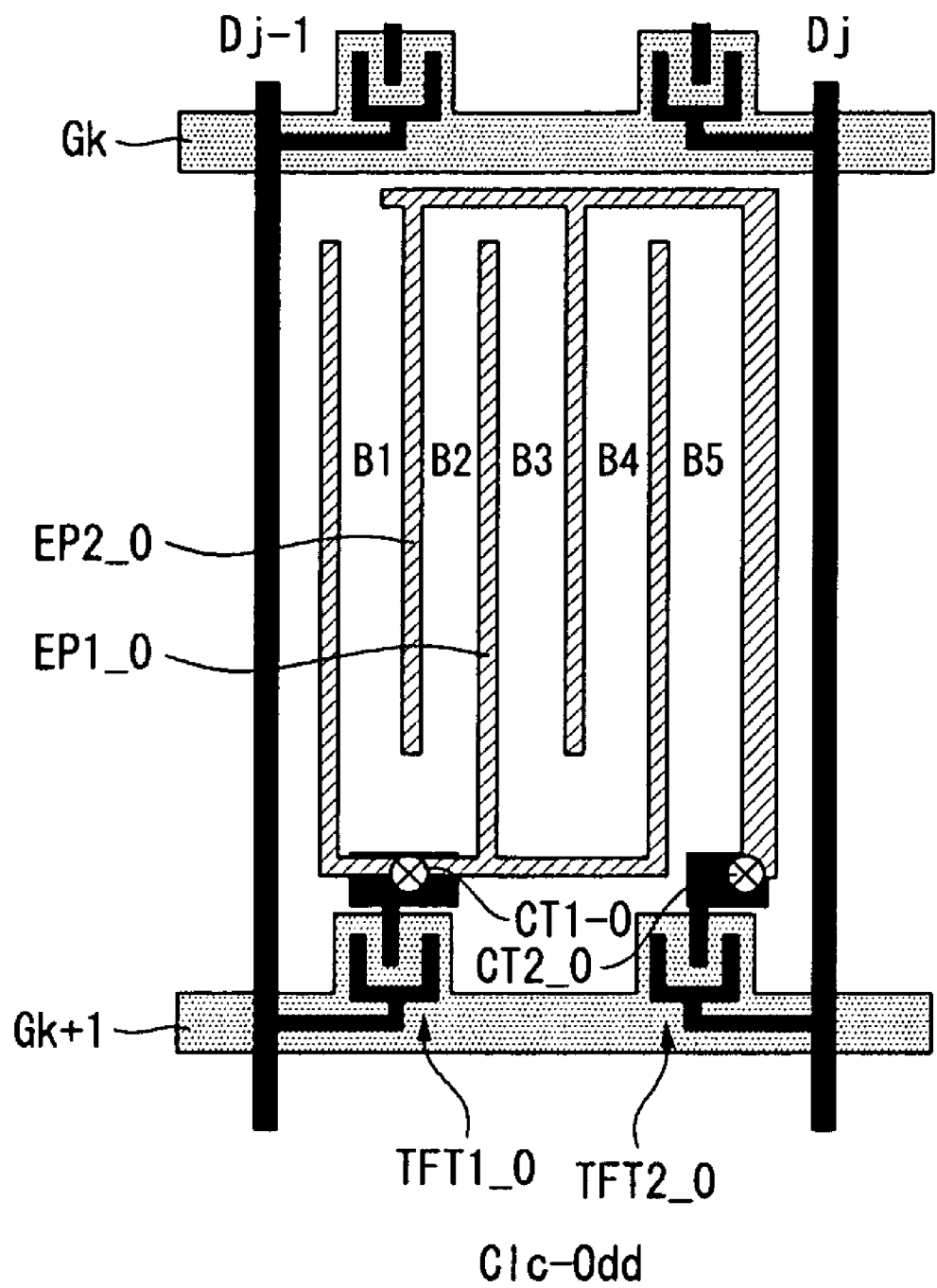
FIGS. 16 and 17 illustrate a third implementation of the liquid crystal display panel in the horizontal electric field LCD according to the second exemplary embodiment of the invention.
Figure 17:
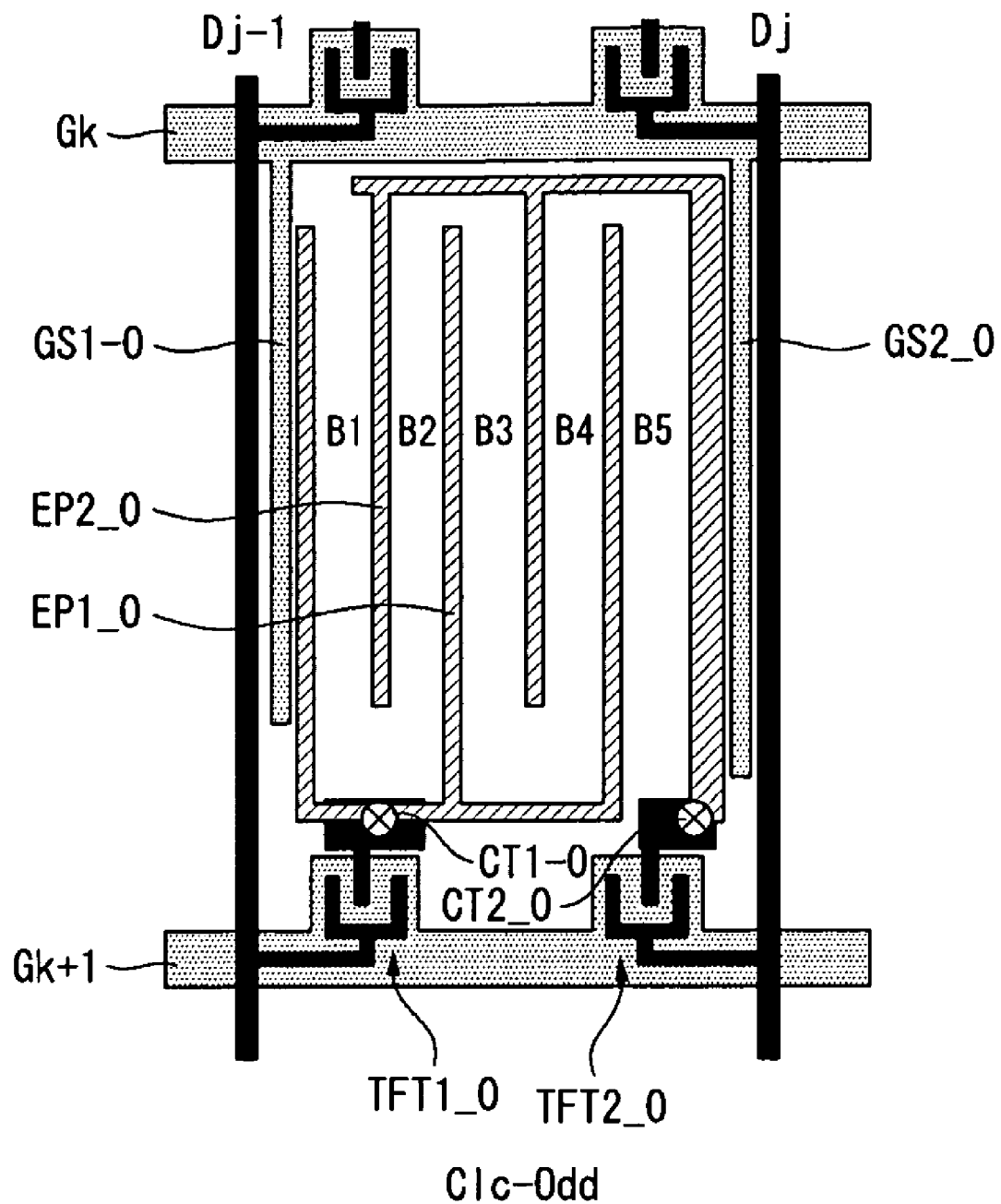

FIGS. 16 and 17 illustrate a third implementation of the liquid crystal display panel 21 in the horizontal electric field LCD according to the second exemplary embodiment of the invention. In FIGS. 16 and 17, the number of opening blocks "B" in the liquid crystal cell is an odd number.

Structures of first and second pixel electrodes EP1_O and EP2_O of an odd-numbered liquid crystal cell Clc_Odd, in which the number of opening blocks "B" is an odd number, shown in FIG. 16 are different from structures of the first and second pixel electrodes EP1_O and EP2_O of the odd-numbered liquid crystal cell Clc_Odd, in which the number of opening blocks "B" is an even number, shown in FIG. 14. More specifically, as shown in FIG. 14, in the odd-numbered liquid crystal cell Clc_Odd, in which the number of opening blocks "B" is an even number, the number of finger units in the second pixel electrode EP2_O is more than the number of finger units in the first pixel electrode EP1_O. On the other hand, as shown in FIG. 16, in the odd-numbered liquid crystal cell Clc_Odd, in which the number of opening blocks "B" is an odd number, the number of finger units in the first pixel electrode EP1_O is equal to the number of finger units in the second pixel electrode EP2_O. Hence, in the odd-numbered liquid crystal cell Clc_Odd, in which the number of opening blocks "B" is an odd number, an influence of a parasitic capacitance Cdp between the data line and the pixel electrode is symmetrically distributed into the first and second pixel electrodes EP1_O and EP2_O. On the other hand, in the odd-numbered liquid crystal cell Clc_Odd, in which the number of opening blocks "B" is an even number, an influence of a parasitic capacitance Cdp between the data line and the pixel electrode is concentrated on the second pixel electrode EP2_O. Accordingly, a drive stability of the odd-numbered liquid crystal cell Clc_Odd, in which the number of opening blocks "B" is an odd number is more excellent than a drive stability of the odd-numbered liquid crystal cell Clc_Odd, in which the number of opening blocks "B" is an even number.

Structures of first and second pixel electrodes EP1_O and EP2_O of an odd-numbered liquid crystal cell Clc_Odd, in which the number of opening blocks "B" is an odd number, shown in FIG. 17 are different from structures of the first and second pixel electrodes EP1_O and EP2_O of the odd-numbered liquid crystal cell Clc_Odd, in which the number of opening blocks "B" is an even number, shown in FIG. 15. More specifically, as shown in FIG. 15, in the odd-numbered liquid crystal cell Clc_Odd, in which the number of opening blocks "B" is an even number, the number of finger units in the second pixel electrode EP2_O is more than the number of finger units in the first pixel electrode EP1_O. On the other hand, as shown in FIG. 17, in the odd-numbered liquid crystal cell Clc_Odd, in which the number of opening blocks "B" is an odd number, the number of finger units in the first pixel electrode EP1_O is equal to the number of finger units in the second pixel electrode EP2_O. In FIG. 17, a first gate shield pattern GS1_O downwardly projects from a first gate line Gk and is spaced apart from an outermost finger unit of the first pixel electrode EP1_O. The first gate shield pattern GS1_O shields a parasitic capacitance Cdp generated between a first data line Dj−1 and the first pixel electrode EP1_O to prevent a voltage of the first pixel electrode EP1_O from changing due to changes in voltages of the first data line Dj−1. Further, a second gate shield pattern GS2_O downwardly projects from the first gate line Gk and is spaced apart from an outermost finger unit of the second pixel electrode EP2_O. The second gate shield pattern GS2_O shields a parasitic capacitance Cdp generated between a second data line Dj and the second pixel electrode EP2_O to prevent a voltage of the second pixel electrode EP2_O from changing due to changes in voltages of the second data line Dj. Hence, in the odd-numbered liquid crystal cell Clc_Odd, in which the number of opening blocks "B" is an odd number, the parasitic capacitance Cdp may be symmetrically shielded. On the other hand, in the odd-numbered liquid crystal cell Clc_Odd, in which the number of opening blocks "B" is an even number, the parasitic capacitance Cdp may be asymmetrically shielded. Accordingly, a drive stability of the odd-numbered liquid crystal cell Clc_Odd, in which the number of opening blocks "B" is an odd number is more excellent than a drive stability of the odd-numbered liquid crystal cell Clc_Odd, in which the number of opening blocks "B" is an even number.

Whether the number of opening blocks "B" is an even number or an odd number may be determined depending on an aperture ratio, changes in a pixel design, changes in a voltage of the pixel electrode resulting from the parasitic capacitance between the data line and the pixel electrode, and the like. FIGS. 16 and 17 illustrate the odd-numbered liquid crystal cell Clc_Odd for convenience of explanation, but configurations illustrated in FIGS. 16 and 17 may be applied to the even-numbered liquid crystal cell Clc_Even.

Figure 18:
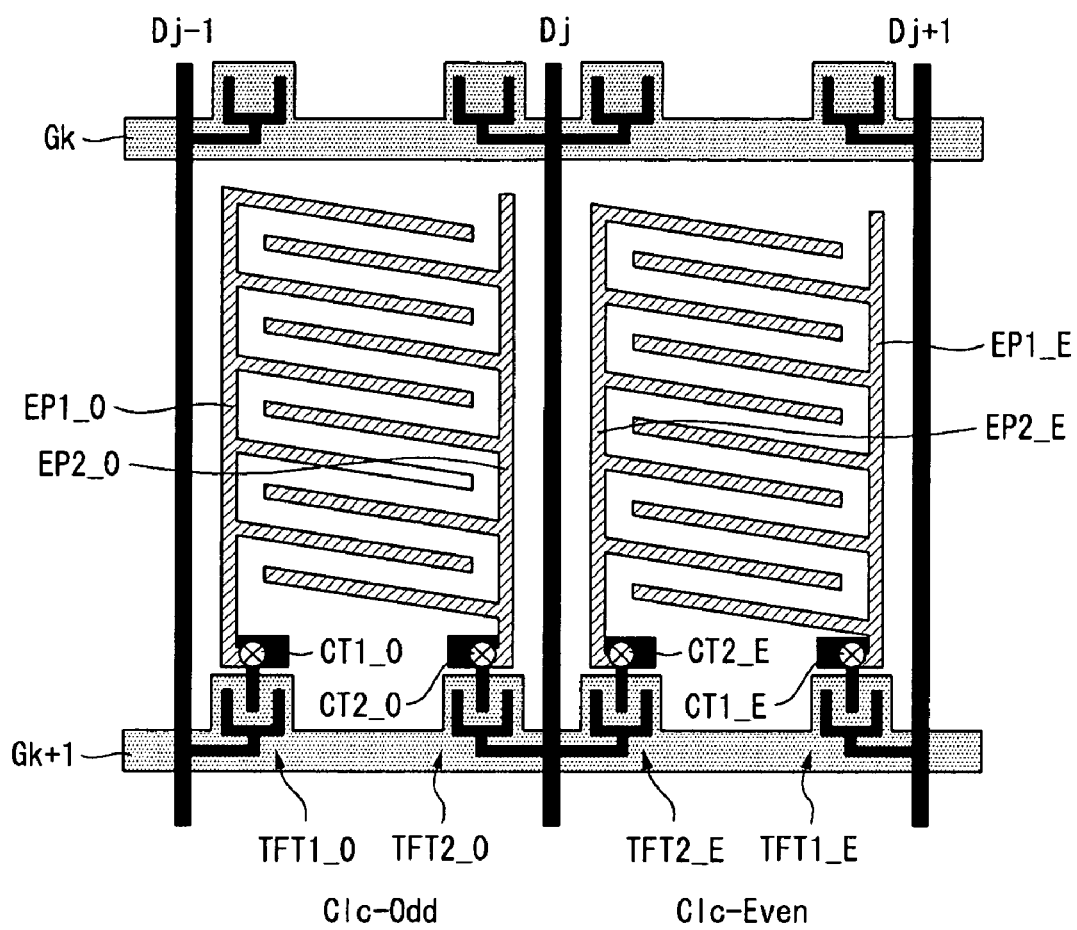
FIGS. 18 and 19 illustrate a fourth implementation of the liquid crystal display panel in the horizontal electric field LCD according to the second exemplary embodiment of the invention.
Figure 19:
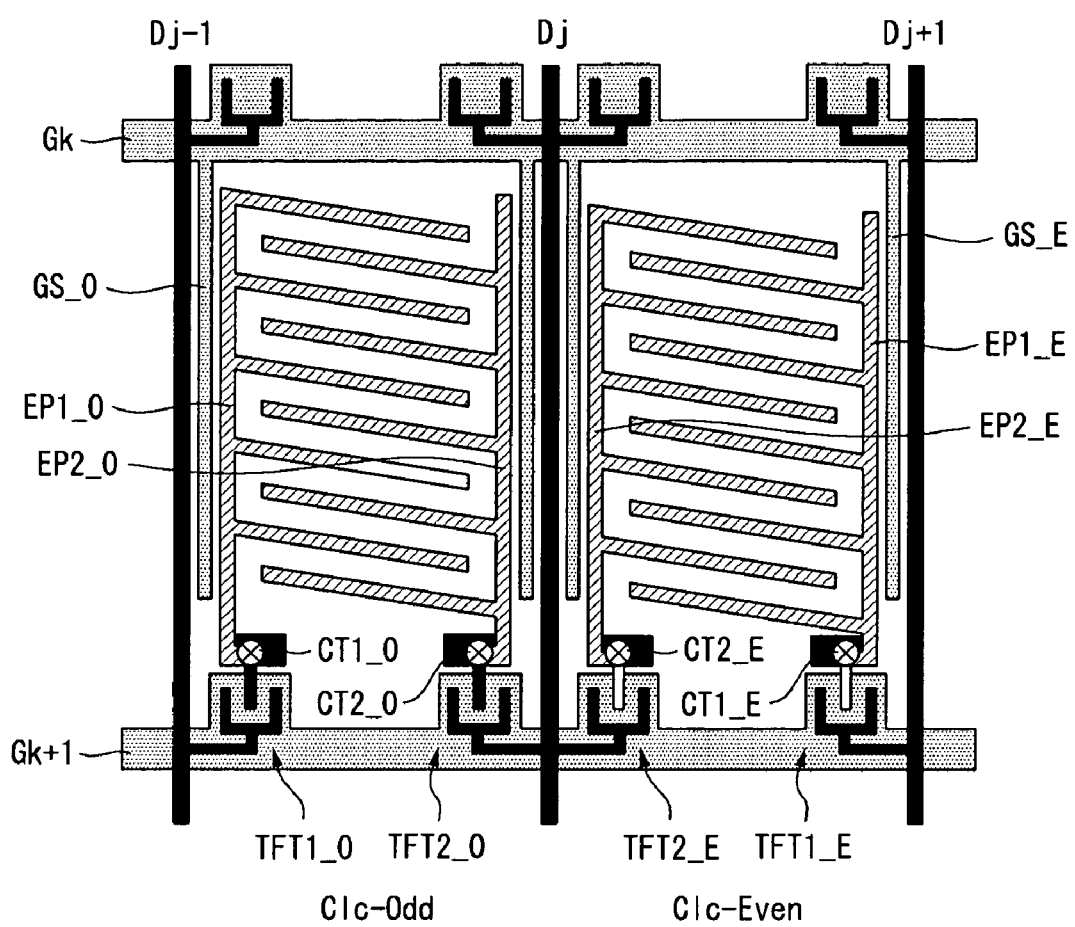

FIGS. 18 and 19 illustrate a fourth implementation of the liquid crystal display panel 21 in the horizontal electric field LCD according to the second exemplary embodiment of the invention. FIGS. 14 and 15 illustrate the liquid crystal display panel 21 operating in a super in-plane switching (S_IPS) mode, and FIGS. 18 and 19 illustrate the liquid crystal display panel 21 operating in a horizontal in-plane switching (H_IPS) mode.

The liquid crystal display panel 21 operating in the H_IPS mode shown in FIGS. 18 and 19 is driven by a voltage difference between first and second pixel electrodes that oppose each other on the same plane. Therefore, a configuration of the liquid crystal display panel 21 according to the fourth implementation shown in FIGS. 18 and 19 is substantially the same as the liquid crystal display panel 21 according to the first implementation shown in FIGS. 14 and 15 except locations and formation angles of finger units and a connection unit. A further description may be briefly made or may be entirely omitted.

As shown in FIGS. 18 and 19, in the same horizontal line to which a second gate line G(k+1) is assigned, a first pixel electrode EP1_O of an odd-numbered liquid crystal cell Clc_Odd includes a plurality of first finger units inclining to gate lines Gk and G(k+1) and a first connection unit that is formed parallel to data lines Dj−1 to Dj+1 to commonly connect the first finger units to one another. A second pixel electrode EP2_O of the odd-numbered liquid crystal cell Clc_Odd includes a plurality of second finger units, that incline to the gate lines Gk and G(k+1) to respectively oppose the first finger units, and a second connection unit that is formed parallel to the data lines Dj−1 to Dj+1 to commonly connect the second finger units to one another.

Further, in the same horizontal line to which the second gate line G(k+1) is assigned, a first pixel electrode EP1_E of an even-numbered liquid crystal cell Clc_Even includes a plurality of first finger units inclining to the gate lines Gk and G(k+1) and a first connection unit that is formed parallel to the data lines Dj−1 to Dj+1 to commonly connect the first finger units to one another. A second pixel electrode EP2_E of the even-numbered liquid crystal cell Clc_Even includes a plurality of second finger units, that incline to the gate lines Gk and G(k+1) and respectively oppose the first finger units, and a second connection unit that is formed parallel to the data lines Dj−1 to Dj+1 to commonly connect the second finger units to one another.

As shown in FIG. 19, in the odd-numbered and even-numbered liquid crystal cells Clc_Odd and Clc_Even, because the pixel electrodes are spaced apart from the gate lines and/or gate shield patterns GS_O and GS_E, the pixel electrodes do not overlap the gate shield patterns GS_O and GS_E.

Figure 20A:
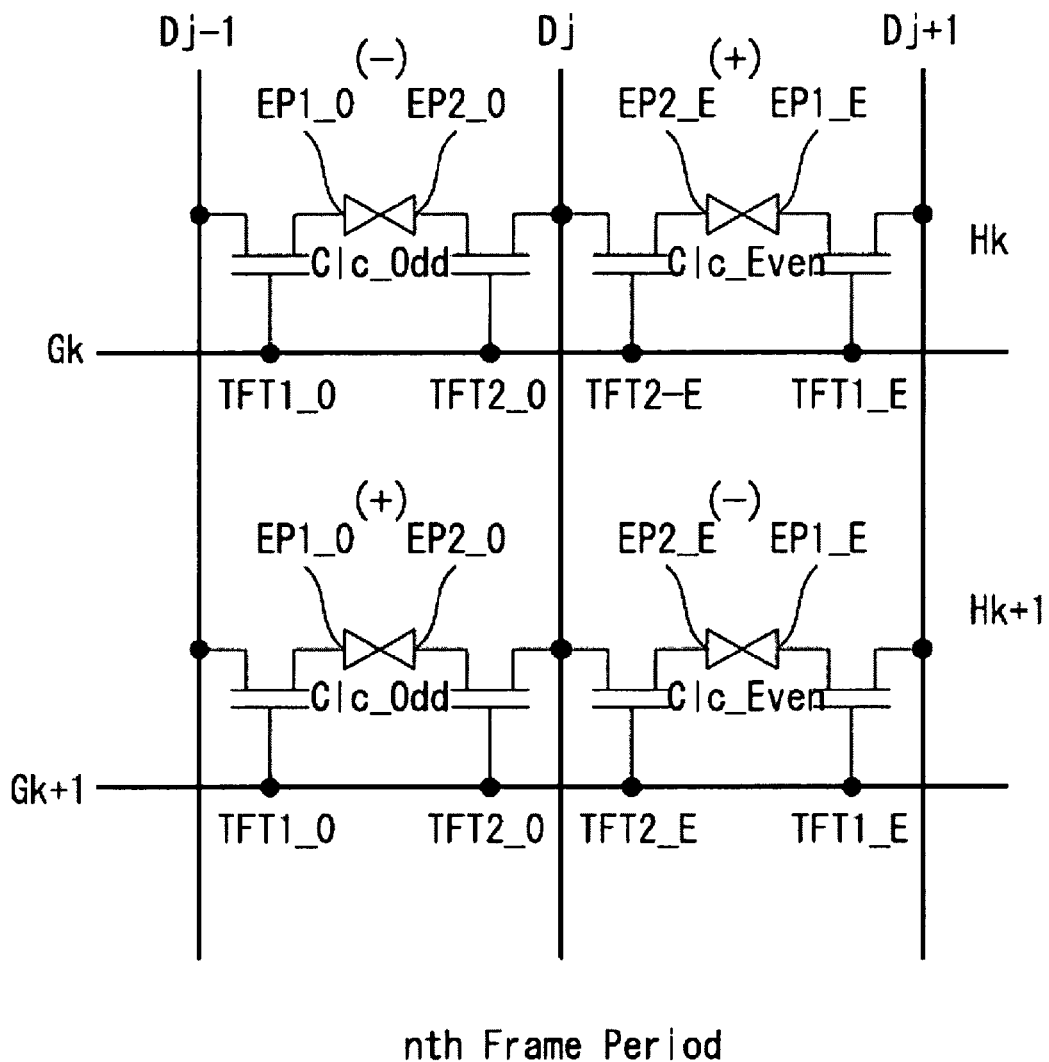
FIGS. 20A and 20B are equivalent circuit diagrams illustrating a driving operation of the horizontal electric field LCD according to the second exemplary embodiment of the invention.
Figure 20B:
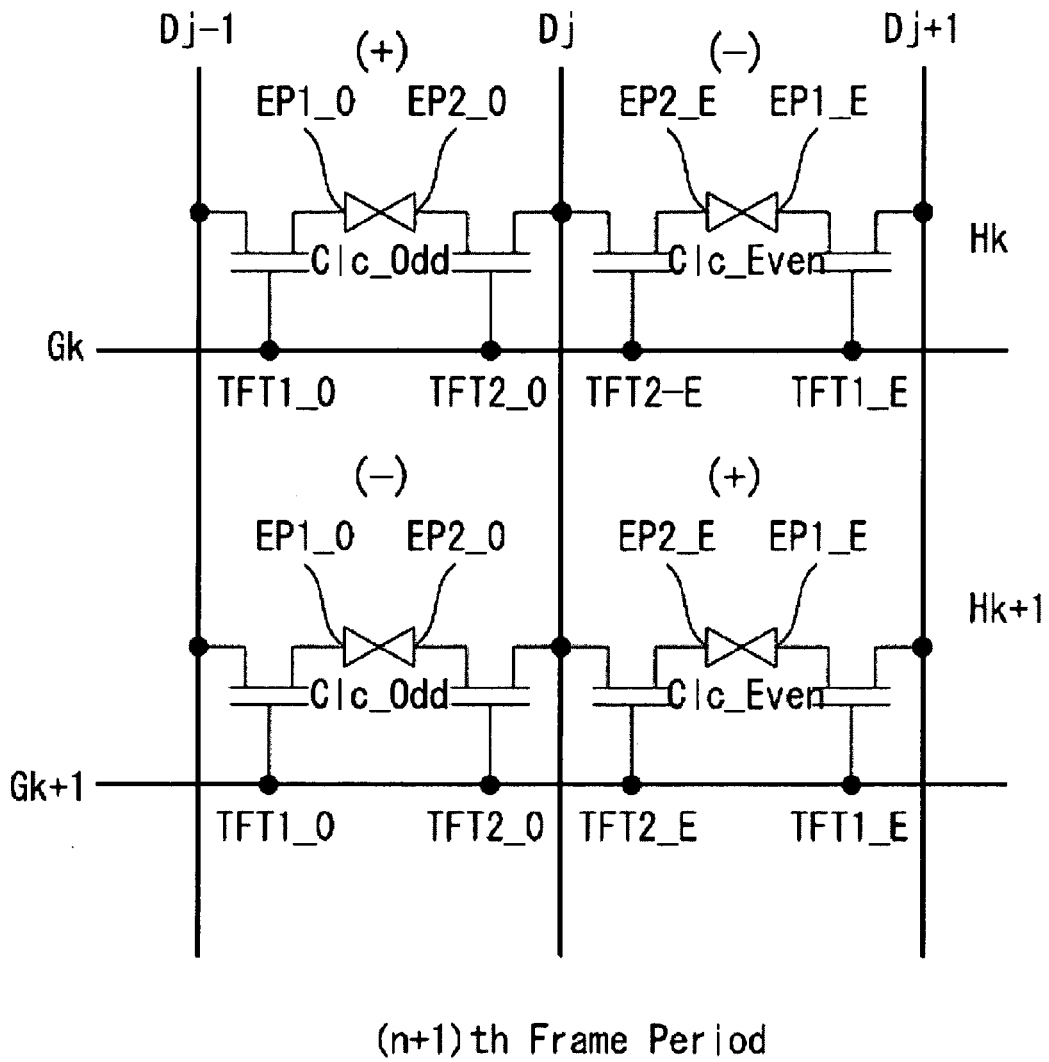

A driving operation of the horizontal electric field LCD according to the second exemplary embodiment of the invention is described below with reference to FIGS. 20A and 20B. In FIGS. 20A and 20B, it is assumed that each liquid crystal cell represents the same gray level during n-th and (n+1)-th frame periods.

As shown in FIG. 20A, during an n-th frame period, an even-numbered liquid crystal cell Clc_Even on a k-th horizontal line Hk is charged to a first polarity (a positive polarity) due to a voltage difference between first and second pixel electrodes EP1_E and EP2_E in response to a scan pulse from a first gate line Gk during 1 horizontal period, and at the same time an odd-numbered liquid crystal cell Clc_Odd on the k-th horizontal line Hk is charged to a second polarity (a negative polarity) due to a voltage difference between first and second pixel electrodes EP1_O and EP2_O in response to a scan pulse from the first gate line Gk during 1 horizontal period. Further, during the n-th frame period, an even-numbered liquid crystal cell Clc_Even on a (k+1)-th horizontal line H(k+1) is charged to the second polarity (a negative polarity) due to a voltage difference between first and second pixel electrodes EP1_E and EP2_E in response to a scan pulse from a second gate line G(k+1) during 1 horizontal period, and at the same time an odd-numbered liquid crystal cell Clc_Odd on the (k+1)-th horizontal line H(k+1) is charged to the first polarity (a positive polarity) due to a voltage difference between first and second pixel electrodes EP1_O and EP2_O in response to a scan pulse from the second gate line G(k+1) during 1 horizontal period.

As shown in FIG. 20B, during an (n+1)-th frame period, the even-numbered liquid crystal cell Clc_Even on the k-th horizontal line Hk is charged to the second polarity (−) due to a voltage difference between the first and second pixel electrodes EP1_E and EP2_E in response to a scan pulse from the first gate line Gk during 1 horizontal period, and at the same time the odd-numbered liquid crystal cell Clc_Odd on the k-th horizontal line Hk is charged to the first polarity (+) due to a voltage difference between the first and second pixel electrodes EP1_O and EP2_O in response to a scan pulse from the first gate line Gk during 1 horizontal period. An absolute value of the voltage difference between the first and second pixel electrodes EP1_E and EP2_E during the (n+1)-th frame period is equal to an absolute value of the voltage difference between the first and second pixel electrodes EP1_E and EP2_E during the n-th frame period. Merely, polarities of the voltage differences are opposite to each other. Further, an absolute value of the voltage difference between the first and second pixel electrodes EP1_O and EP2_O during the (n+1)-th frame period is equal to an absolute value of the voltage difference between the first and second pixel electrodes EP1_O and EP2_O during the n-th frame period. Merely, polarities of the voltage differences are opposite to each other. Accordingly, in an inversion scheme, non-uniformity of charge amounts of each of the even-numbered and odd-numbered liquid crystal cells Clc_Even and Clc_Odd on the k-th horizontal line Hk during frame periods is solved.

Further, during the (n+1)-th frame period, the even-numbered liquid crystal cell Clc_Even on the (k+1)-th horizontal line H(k+1) is charged to the first polarity (+) due to a voltage difference between the first and second pixel electrodes EP1_E and EP2_E in response to a scan pulse from the second gate line G(k+1) during 1 horizontal period, and at the same time the odd-numbered liquid crystal cell Clc_Odd on the (k+1)-th horizontal line H(k+1) is charged to the second polarity (−) due to a voltage difference between the first and second pixel electrodes EP1_O and EP2_O in response to a scan pulse from the second gate line G(k+1) during 1 horizontal period. An absolute value of the voltage difference between the first and second pixel electrodes EP1_E and EP2_E during the (n+1)-th frame period is equal to an absolute value of the voltage difference between the first and second pixel electrodes EP1_E and EP2_E during the n-th frame period. Merely, polarities of the voltage differences are opposite to each other. Further, an absolute value of the voltage difference between the first and second pixel electrodes EP1_O and EP2_O during the (n+1)-th frame period is equal to an absolute value of the voltage difference between the first and second pixel electrodes EP1_O and EP2_O during the n-th frame period. Merely, polarities of the voltage differences are opposite to each other. Accordingly, in an inversion scheme, non-uniformity of charge amounts of each of the even-numbered and odd-numbered liquid crystal cells Clc_Even and Clc_Odd on the (k+1)-th horizontal line H(k+1) during frame periods is solved.

In the horizontal electric field LCD according to the second exemplary embodiment of the invention, as described above with reference to FIGS. 12A and 12B, because there is no difference between charging voltages of all of parasitic capacitors during frame periods and there is no difference between feed through voltages during the frame periods, non-uniformity of charge amounts of the liquid crystal cell during the frame periods is solved. A large-capacity storage capacitor was formed to solve non-uniformity of charge amounts of the liquid crystal cell during frame periods in the related art, but the storage capacitor may be omitted in the second exemplary embodiment.

As described above, in the horizontal electric field LCD according to the second exemplary embodiment of the invention, because a common electrode is removed and the liquid crystal cell is driven due to a voltage difference between the pixel electrodes using the two TFTs, there is no difference between positive and negative feed through voltages ΔVp in the inversion scheme. Hence, the non-uniformity of charge amounts of the same liquid crystal cell during frame periods can be solved, and the deterioration of the image quality can be prevented. Further, because a separate storage capacitor as well as the common electrode may be omitted, the aperture ratio can greatly increase. Furthermore, in the horizontal electric field LCD according to the second exemplary embodiment of the invention, because the odd-numbered liquid crystal cells and the even-numbered liquid crystal cells on the same horizontal line are simultaneously driven using one gate line, charging time in the second exemplary embodiment can be sufficiently secured as compared with the first exemplary embodiment. On the other hand, in the horizontal electric field LCD according to the second exemplary embodiment of the invention, because data voltages with the same level are simultaneously applied to adjacent liquid crystal cells during one scan time, a high potential driving voltage that is higher than 2 times a liquid crystal driving voltage has to be applied to the data drive circuit. Accordingly, the horizontal electric field LCD according to the second exemplary embodiment of the invention is more disadvantageous than the horizontal electric field LCD according to the first exemplary embodiment of the invention in power consumption.

Third Exemplary Embodiment

Figure 21:
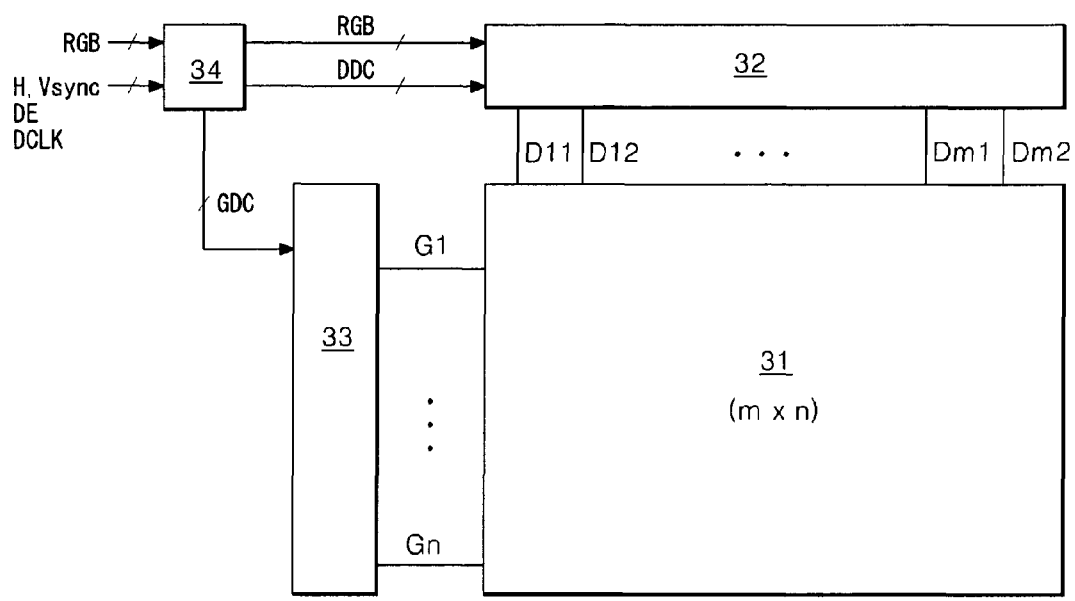
FIG. 21 is a block diagram showing a horizontal electric field LCD according to a third exemplary embodiment of the invention.
Figure 22:
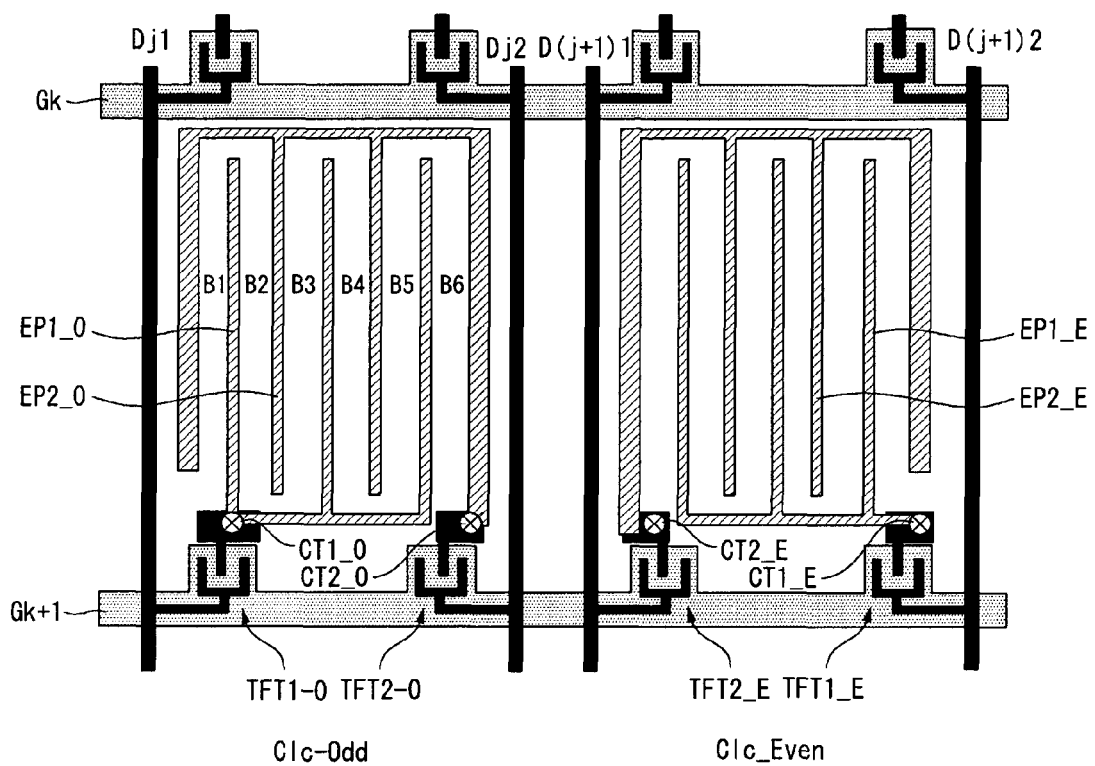
FIG. 22 illustrates a first implementation of a liquid crystal display panel in the horizontal electric field LCD according to the third exemplary embodiment of the invention.
Figure 23:
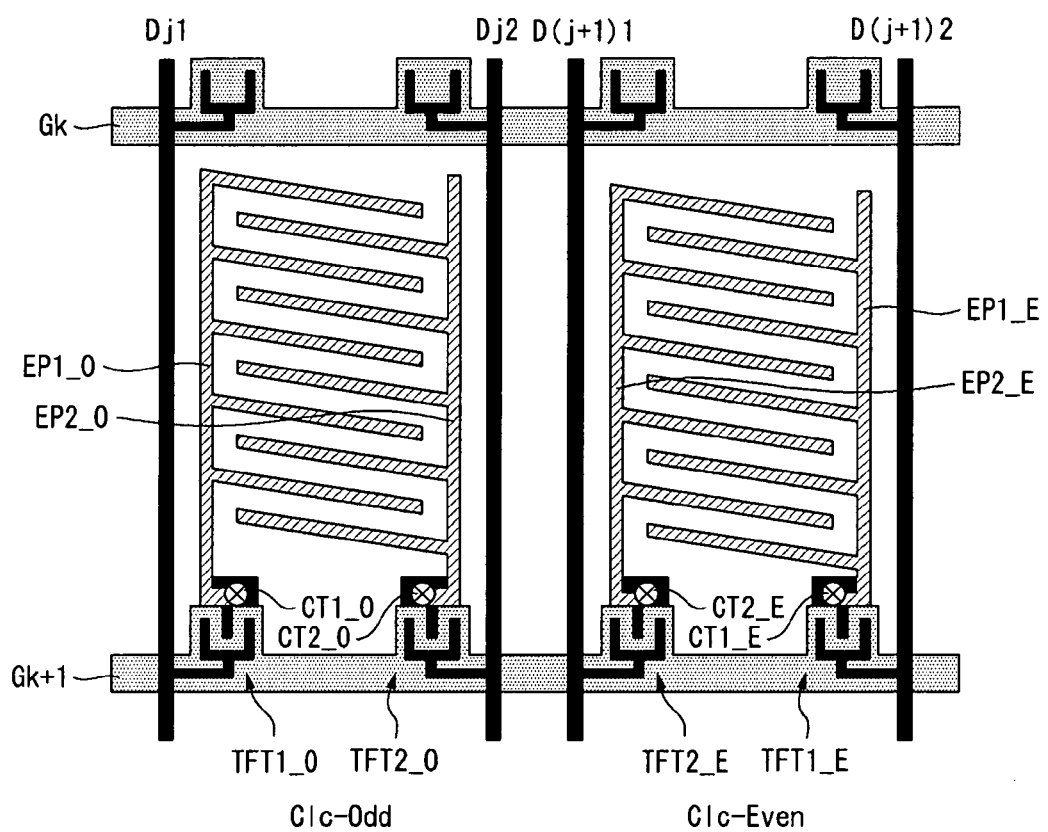
FIG. 23 illustrates a second implementation of the liquid crystal display panel in the horizontal electric field LCD according to the third exemplary embodiment of the invention.

FIGS. 21 to 23 illustrate a horizontal electric field LCD according to a third exemplary embodiment of the invention.

As shown in FIG. 21, the horizontal electric field LCD according to the third exemplary embodiment of the invention includes a liquid crystal display panel 21, a data drive circuit 22, a gate drive circuit 23, and a timing controller 24.

Since configurations and operations of the data drive circuit 32, the gate drive circuit 33, and the timing controller 34 are substantially the same as those illustrated in the first exemplary embodiment, a further description may be briefly made or may be entirely omitted.

The liquid crystal display panel 31 includes an upper glass substrate, a lower glass substrate, and a liquid crystal layer between the upper and lower glass substrates. The liquid crystal display panel 31 includes m×n liquid crystal cells Clc arranged in a matrix format at each crossing of m pairs of data lines (D11, D12) to (Dm1, Dm2) and n gate lines G1 to Gn. Namely, a pair of data lines and one gate line are assigned to each liquid crystal cell Clc.

A black matrix and a color filter are formed on the upper glass substrate of the liquid crystal display panel 31. The data line pairs (D11, D12) to (Dm1, Dm2), the gate lines G1 to Gn, thin film transistors (TFTs), and a storage capacitor are formed on the lower glass substrate of the liquid crystal display panel 31. Polarizing plates are attached respectively to the upper and lower glass substrates. Alignment layers for setting a pre-tilt angle of liquid crystals are respectively formed on the upper and lower glass substrates.

FIG. 22 illustrates a first implementation of the liquid crystal display panel 31 in the horizontal electric field LCD according to the third exemplary embodiment of the invention. In FIG. 22, the number of opening blocks "B" in the liquid crystal cell is an even number.

As shown in FIG. 22, in the same horizontal line to which a second gate line G(k+1) is assigned, an odd-numbered liquid crystal cell Clc_Odd is driven by a horizontal electric field between first and second pixel electrodes EP1_O and EP2_O that oppose each other on the same plane. For this, the first pixel electrode EP1_O of the odd-numbered liquid crystal cell Clc_Odd includes a plurality of first finger units parallel to data lines Dj1 to D(j+1)2 and a first connection unit that is formed parallel to gate lines Gk and G(k+1) to commonly connect the first finger units to one another. The first pixel electrode EP1_O is connected to a first TFT TFT1_O through a first contact hole CT1_O. The first TFT TFT1_O supplies a first analog data voltage from the first data line Dj1 to the first pixel electrode EP1_O in response to a scan pulse from the second gate line G(k+1). Further, the second pixel electrode EP2_O of the odd-numbered liquid crystal cell Clc_Odd includes a plurality of second finger units, that are formed parallel to the data lines Dj1 to D(j+1)2 to respectively oppose the first finger units, and a second connection unit that is formed parallel to the gate lines Gk and G(k+1) to commonly connect the second finger units to one another. The second connection unit is positioned to be spaced apart from the first gate line Gk at a constant distance. The second pixel electrode EP2_O is connected to a second TFT TFT2_O through a second contact hole CT2_O. The second TFT TFT2_O supplies a second analog data voltage from the second data line Dj2 to the second pixel electrode EP2_O in response to a scan pulse from the second gate line G(k+1).

Further, in the same horizontal line to which the second gate line G(k+1) is assigned, an even-numbered liquid crystal cell Clc_Even is driven by a horizontal electric field between first and second pixel electrodes EP1_E and EP2_E that oppose each other on the same plane. For this, the first pixel electrode EP1_E of the even-numbered liquid crystal cell Clc_Even includes a plurality of first finger units parallel to the data lines Dj1 to D(j+1)2 and a first connection unit that is formed parallel to the gate lines Gk and G(k+1) to commonly connect the first finger units to one another. The first pixel electrode EP1_E is connected to a first TFT TFT1_E through a first contact hole CT1_E. The first TFT TFT1_E supplies a fourth analog data voltage from the fourth data line D(j+1)2 to the first pixel electrode EP1_E in response to a scan pulse from the second gate line G(k+1). Further, the second pixel electrode EP2_E of the even-numbered liquid crystal cell Clc_Even includes a plurality of second finger units, that are formed parallel to the data lines Dj1 to D(j+1)2 to respectively oppose the first finger units, and a second connection unit that is formed parallel to the gate lines Gk and G(k+1) to commonly connect the second finger units to one another. The second pixel electrode EP2_E is connected to a second TFT TFT2_E through a second contact hole CT2_E. The second TFT TFT2_E supplies a third analog data voltage from the third data line D(j+1)1 to the second pixel electrode EP2_E in response to a scan pulse from the second gate line G(k+1).

Although it is not shown, the liquid crystal display panel 31 according to the first implementation may have a structure in which the number of opening blocks "B" in the liquid crystal cell is an odd number. The liquid crystal display panel 31 according to the first implementation may further include a gate shield pattern.

FIG. 23 illustrates a second implementation of the liquid crystal display panel 31 in the horizontal electric field LCD according to the third exemplary embodiment of the invention. FIG. 22 illustrates the liquid crystal display panel 31 operating in a super in-plane switching (S_IPS) mode, and FIG. 23 illustrates the liquid crystal display panel 31 operating in a horizontal in-plane switching (H_IPS) mode.

The liquid crystal display panel 31 operating in the H_IPS mode shown in FIG. 23 is driven by a voltage difference between first and second pixel electrodes that oppose each other on the same plane. Therefore, a configuration of the liquid crystal display panel 31 according to the second implementation shown in FIG. 23 is substantially the same as the liquid crystal display panel 31 according to the first implementation shown in FIG. 22 except locations and formation angles of finger units and a connection unit. A further description may be briefly made or may be entirely omitted.

As shown in FIG. 23, in the same horizontal line to which a second gate line G(k+1) is assigned, a first pixel electrode EP1_O of an odd-numbered liquid crystal cell Clc_Odd includes a plurality of first finger units inclining to gate lines Gk and G(k+1) and a first connection unit that is formed parallel to data lines Dj1 to D(j+1)2 to commonly connect the first finger units to one another. A second pixel electrode EP2_O of the odd-numbered liquid crystal cell Clc_Odd includes a plurality of second finger units, that incline to the gate lines Gk and G(k+1) and respectively oppose the first finger units, and a second connection unit that is formed parallel to the data lines Dj1 to D(j+1)2 to commonly connect the second finger units to one another.

Further, in the same horizontal line to which the second gate line G(k+1) is assigned, a first pixel electrode EP1_E of an even-numbered liquid crystal cell Clc_Even includes a plurality of first finger units inclining to the gate lines Gk and G(k+1) and a first connection unit that is formed parallel to the data lines Dj1 to D(j+1)2 to commonly connect the first finger units to one another. A second pixel electrode EP2_E of the even-numbered liquid crystal cell Clc_Even includes a plurality of second finger units, that incline to the gate lines Gk and G(k+1) and respectively oppose the first finger units, and a second connection unit that is formed parallel to the data lines Dj1 to D(j+1)2 to commonly connect the second finger units to one another.

Although it is not shown, the liquid crystal display panel 31 according to the second implementation may further include gate shield patterns. In the odd-numbered and even-numbered liquid crystal cells Clc_Odd and Clc_Even, because the pixel electrodes may be spaced apart from the gate lines and/or the gate shield patterns, the pixel electrodes do not overlap the gate shield patterns.

As described above, in the horizontal electric field LCD according to the third exemplary embodiment of the invention, because a common electrode is removed and the liquid crystal cell is driven due to a voltage difference between the pixel electrodes using the two TFTs, there is no difference between positive and negative feed through voltages ΔVp in the inversion scheme. Hence, the non-uniformity of charge amounts of the same liquid crystal cell during frame periods can be solved, and the deterioration of the image quality can be prevented. Further, because a separate storage capacitor as well as the common electrode may be omitted, the aperture ratio can greatly increase. Furthermore, in the horizontal electric field LCD according to the third exemplary embodiment of the invention, because the odd-numbered liquid crystal cells and the even-numbered liquid crystal cells on the same horizontal line are simultaneously driven using one gate line, charging time in the third exemplary embodiment can be sufficiently secured as compared with the first exemplary embodiment. Furthermore, in the horizontal electric field LCD according to the third exemplary embodiment of the invention, because two data lines are assigned to each liquid crystal cell and the same data voltage is not applied to adjacent liquid crystal cells, a high potential driving voltage may be used as a liquid crystal driving voltage. Accordingly, the horizontal electric field LCD according to the third exemplary embodiment of the invention is more advantageous than the horizontal electric field LCD according to the second exemplary embodiment of the invention in power consumption.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A horizontal electric field liquid crystal display (LCD) comprising:
   a first liquid crystal cell that is driven by a voltage difference between a first pixel electrode and a second pixel electrode;
   a second liquid crystal cell that is driven by a voltage difference between a third pixel electrode and a fourth pixel electrode;
   a first data line to which a first analog data voltage to be applied to the first pixel electrode is supplied;
   a second data line to which a second analog data voltage to be applied to the second pixel electrode and a fourth analog data voltage to be applied to the fourth pixel electrode are supplied;
   a third data line to which a third analog data voltage to be applied to the third pixel electrode is supplied;
   a first gate line that crosses the first to third data lines and receives a first scan pulse to select the first liquid crystal cell;
   a second gate line that crosses the first to third data lines and receives a second scan pulse to select the second liquid crystal cell;
   a first thin film transistor that supplies the first analog data voltage to the first pixel electrode in response to the first scan pulse;
   a second thin film transistor that supplies the second analog data voltage to the second pixel electrode in response to the first scan pulse;
   a third thin film transistor that supplies the third analog data voltage to the third pixel electrode in response to the second scan pulse; and
   a fourth thin film transistor that supplies the fourth analog data voltage to the fourth pixel electrode in response to the second scan pulse,
   wherein the second pixel electrode is spaced apart from the second gate line, and the fourth pixel electrode is spaced apart from the first gate line.

2. The horizontal electric field LCD of claim 1, wherein each of the first and second scan pulses has a width of ½ horizontal period,
   wherein a supply of the first scan pulse follows a supply of the second scan pulse.

3. The horizontal electric field LCD of claim 1, wherein each of the first and third pixel electrodes includes a plurality of first finger units parallel to the first to third data lines and a first connection unit that is formed parallel to the first and second gate lines to commonly connect the first finger units to one another, wherein each of the second and fourth pixel electrodes includes a plurality of second finger units, that are formed parallel to the first to third data lines to respectively oppose the first finger units, and a second connection unit that is formed parallel to the first and second gate lines to commonly connect the second finger units to one another.

4. The horizontal electric field LCD of claim 3, wherein the first liquid crystal cell further includes a first gate shield pattern, that projects from the second gate line and is formed parallel to the first data line to be spaced apart from the first data line at a predetermined distance, and a second gate shield pattern that projects from the second gate line and is formed parallel to the second data line to be spaced apart from the second data line at a predetermined distance, wherein the second liquid crystal cell further includes a third gate shield pattern, that projects from the first gate line and is formed parallel to the second data line to be spaced apart from the second data line at a predetermined distance, and a fourth gate shield pattern that projects from the first gate line and is formed parallel to the third data line to be spaced apart from the third data line at a predetermined distance.

5. The horizontal electric field LCD of claim 4, wherein outermost finger units at both sides of the second pixel electrode are respectively spaced apart from the first and second gate shield patterns, wherein outermost finger units at both sides of the fourth pixel electrode are respectively spaced apart from the third and fourth gate shield patterns.

6. The horizontal electric field LCD of claim 3, wherein a number of first finger units is equal to a number of second finger units or is fewer one than the number of second finger units.

7. The horizontal electric field LCD of claim 1, wherein each of the first and third pixel electrodes includes a plurality of first finger units inclining to the first and second gate lines and a first connection unit that is formed parallel to the first to third data lines to commonly connect the first finger units to one another, wherein each of the second and fourth pixel electrodes includes a plurality of second finger units, that incline to the first and second gate lines to respectively oppose the first finger units, and a second connection unit that is formed parallel to the first to third data lines to commonly connect the second finger units to one another.

8. The horizontal electric field LCD of claim 7, wherein the first liquid crystal cell further includes a first gate shield pattern, that projects from the second gate line and is formed parallel to the first data line to be spaced apart from the first data line at a predetermined distance, and a second gate shield pattern that projects from the second gate line and is formed parallel to the second data line to be spaced apart from the second data line at a predetermined distance, wherein the second liquid crystal cell further includes a third gate shield pattern, that projects from the first gate line and is formed parallel to the second data line to be spaced apart from the second data line at a predetermined distance, and a fourth gate shield pattern that projects from the first gate line and is formed parallel to the third data line to be spaced apart from the third data line at a predetermined distance.

9. The horizontal electric field LCD of claim 8, wherein the connection units of the first to fourth pixel electrodes are spaced apart from the first to fourth gate shield patterns, respectively.

10. A horizontal electric field liquid crystal display (LCD) comprising:
a first liquid crystal cell that is driven by a voltage difference between a first pixel electrode and a second pixel electrode;
a second liquid crystal cell that is driven by a voltage difference between a third pixel electrode and a fourth pixel electrode;
a first data line to which a first analog data voltage to be applied to the first pixel electrode is supplied;
a second data line to which a second analog data voltage to be applied to the second and fourth pixel electrodes is supplied;
a third data line to which a third analog data voltage to be applied to the third pixel electrode is supplied;
a gate line that crosses the first to third data lines and receives a scan pulse to select the first and second liquid crystal cells;
a first thin film transistor that supplies the first analog data voltage to the first pixel electrode in response to the scan pulse;
a second thin film transistor that supplies the second analog data voltage to the second pixel electrode in response to the scan pulse;
a third thin film transistor that supplies the third analog data voltage to the third pixel electrode in response to the scan pulse; and
a fourth thin film transistor that supplies the second analog data voltage to the fourth pixel electrode in response to the scan pulse,
wherein each of the second and fourth pixel electrodes is spaced apart from a previous gate line to which the scan pulse is supplied earlier than the gate line.

11. The horizontal electric field LCD of claim 10, wherein each of the first and third pixel electrodes includes a plurality of first finger units parallel to the first to third data lines and a first connection unit that is formed parallel to the gate lines to commonly connect the first finger units to one another, wherein each of the second and fourth pixel electrodes includes a plurality of second finger units, that are formed parallel to the first to third data lines to respectively oppose the first finger units, and a second connection unit that is formed parallel to the gate lines to commonly connect the second finger units to one another.

12. The horizontal electric field LCD of claim 11, wherein the first liquid crystal cell further includes a first gate shield pattern, that projects from the previous gate line and is formed parallel to the first data line to be spaced apart from the first data line at a predetermined distance, and a second gate shield pattern that projects from the previous gate line and is formed parallel to the second data line to be spaced apart from the second data line at a predetermined distance, wherein the second liquid crystal cell further includes a third gate shield pattern, that projects from the previous gate line and is formed parallel to the second data line to be spaced apart from the second data line at a predetermined distance, and a fourth gate shield pattern that projects from the previous gate line and is formed parallel to the third data line to be spaced apart from the third data line at a predetermined distance.

13. The horizontal electric field LCD of claim 12, wherein outermost finger units at both sides of the second pixel electrode are respectively spaced apart from the first and second gate shield patterns,
   wherein outermost finger units at both sides of the fourth pixel electrode are respectively spaced apart from the third and fourth gate shield patterns.

14. The horizontal electric field LCD of claim 12, wherein a number of first finger units is equal to a number of second finger units or is fewer one than the number of second finger units.

15. The horizontal electric field LCD of claim 10, wherein each of the first and third pixel electrodes includes a plurality of first finger units inclining to the gate lines and a first connection unit that is formed parallel to the first to third data lines to commonly connect the first finger units to one another,
   wherein each of the second and fourth pixel electrodes includes a plurality of second finger units, that incline to the gate lines to respectively oppose the first finger units, and a second connection unit that is formed parallel to the first to third data lines to commonly connect the second finger units to one another.

16. The horizontal electric field LCD of claim 15, wherein the first liquid crystal cell further includes a first gate shield pattern, that projects from the gate line and is formed parallel to the first data line to be spaced apart from the first data line at a predetermined distance, and a second gate shield pattern that projects from the previous gate line and is formed parallel to the second data line to be spaced apart from the second data line at a predetermined distance,
   wherein the second liquid crystal cell further includes a third gate shield pattern, that projects from the previous gate line and is formed parallel to the second data line to be spaced apart from the second data line at a predetermined distance, and a fourth gate shield pattern that projects from the previous gate line and is formed parallel to the third data line to be spaced apart from the third data line at a predetermined distance.

17. The horizontal electric field LCD of claim 15, wherein the connection units of the first to fourth pixel electrodes are spaced apart from the first to fourth gate shield patterns, respectively.

* * * * *